United States Patent
Shoda et al.

(10) Patent No.: US 11,254,097 B2
(45) Date of Patent: Feb. 22, 2022

(54) BARRIER FILM LAMINATE, METHOD OF PRODUCING THE SAME, WAVELENGTH CONVERSION SHEET, BACKLIGHT UNIT, AND ELECTROLUMINESCENT LIGHT-EMITTING UNIT

(71) Applicant: TOPPAN PRINTING CO., LTD., Tokyo (JP)

(72) Inventors: Ryo Shoda, Tokyo (JP); Fumitake Suzuki, Tokyo (JP); Koji Murata, Tokyo (JP); Masato Kurokawa, Tokyo (JP); Kengo Ozono, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 321 days.

(21) Appl. No.: 16/156,450

(22) Filed: Oct. 10, 2018

(65) Prior Publication Data

US 2019/0039349 A1 Feb. 7, 2019

Related U.S. Application Data

(63) Continuation of application No. PCT/JP2017/014564, filed on Apr. 7, 2017.

(30) Foreign Application Priority Data

Apr. 11, 2016 (JP) .................................. 2016-078930
Apr. 11, 2016 (JP) ............................. JP2016-078927
Jun. 20, 2016 (JP) .................................. 2016-121974

(51) Int. Cl.
*B32B 7/12* (2006.01)
*B32B 27/08* (2006.01)
(Continued)

(52) U.S. Cl.
CPC .................. *B32B 7/12* (2013.01); *B32B 9/00* (2013.01); *B32B 27/00* (2013.01); *B32B 27/08* (2013.01);
(Continued)

(58) Field of Classification Search
None
See application file for complete search history.

(56) References Cited

U.S. PATENT DOCUMENTS 5,139,857 A * 8/1992 Herndon ................... B32B 7/12
428/220
8,517,551 B2 8/2013 Tsukahara et al.
(Continued)

FOREIGN PATENT DOCUMENTS

JP 2006-051751 A 2/2006
JP 2008-087176 A 4/2008
(Continued)

OTHER PUBLICATIONS

Office Action dated Mar. 31, 2020 for corresponding Chinese Patent Application No. 201780023047.1.
(Continued)

*Primary Examiner* — Cheng Yuan Huang
(74) *Attorney, Agent, or Firm* — Foley & Lardner LLP

(57) ABSTRACT

The present invention provides a barrier film laminate including a first barrier film that includes a first substrate layer and a first barrier layer formed on the first substrate layer, a second barrier film that includes a second substrate layer and a second barrier layer formed on the substrate layer, and an adhesive layer. In the barrier film laminate, the first barrier film is bonded with the second barrier film so that the first barrier layer faces the second barrier layer with the adhesive layer interposed therebetween. In one embodiment of the barrier film laminate, the adhesive layer is (Continued)

formed of an adhesive containing an epoxy resin, a curing agent having an amino group, and either a silane coupling agent having an epoxy group or a silane coupling agent having an amino group and two hydrolyzable functional groups.

12 Claims, 7 Drawing Sheets

(51) Int. Cl.
  *B32B 27/36* (2006.01)
  *B32B 37/12* (2006.01)
  *B32B 37/18* (2006.01)
  *G02F 1/13357* (2006.01)
  *H05B 33/04* (2006.01)
  *B32B 27/00* (2006.01)
  *B32B 9/00* (2006.01)

(52) U.S. Cl.
  CPC .............. *B32B 27/36* (2013.01); *B32B 37/12* (2013.01); *B32B 37/182* (2013.01); *H05B 33/04* (2013.01); *B32B 2037/1253* (2013.01); *B32B 2255/10* (2013.01); *B32B 2255/20* (2013.01); *B32B 2255/26* (2013.01); *B32B 2255/28* (2013.01); *B32B 2305/72* (2013.01); *B32B 2307/42* (2013.01); *B32B 2307/7244* (2013.01); *B32B 2307/7246* (2013.01); *B32B 2367/00* (2013.01); *B32B 2457/202* (2013.01)

(56) References Cited

U.S. PATENT DOCUMENTS

| 10,227,514 | B2* | 3/2019 | Yoo ........................ H05B 33/04 |
| 2010/0160494 | A1* | 6/2010 | Yonehama .............. B32B 27/34 523/400 |
| 2016/0327690 | A1 | 11/2016 | Tokinoya et al. |

FOREIGN PATENT DOCUMENTS

| JP | 2009-092224 A | 4/2009 |
| JP | 2011-013567 A | 1/2011 |
| JP | 2012-076288 A | 4/2012 |
| JP | 2013-075413 A | 4/2013 |
| JP | 2014-141056 A | 8/2014 |
| JP | 2015-068484 A | 4/2015 |
| WO | WO-2016/010116 A1 | 1/2016 |
| WO | WO-2016/031876 A | 3/2016 |

OTHER PUBLICATIONS

Office Action dated Mar. 10, 2020 for corresponding Japanese Patent Application No. 2016-078930.
International Search Report regarding Application No. PCT/JP2017/014564, dated Jun. 27, 2017, 2 pps.
Office Action dated Apr. 19, 2021, issued in a corresponding Korean Patent Application No. 10-2018-7031681, (15 pages).

* cited by examiner

BARRIER FILM LAMINATE, METHOD OF PRODUCING THE SAME, WAVELENGTH CONVERSION SHEET, BACKLIGHT UNIT, AND ELECTROLUMINESCENT LIGHT-EMITTING UNIT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/014564, filed on Apr. 7, 2017, which is based upon and claims the benefit of priority to Japanese Patent Application Nos. 2016-078927, filed on Apr. 11, 2016, 2016-078930, filed on Apr. 11, 2016, and 2016-121974, filed on Jun. 20, 2016, the disclosures of which are all hereby incorporated herein by reference in their entireties.

TECHNICAL FIELD

The present invention relates to a barrier film laminate, a method of producing the same, a wavelength conversion sheet, a backlight unit, and an electroluminescent light-emitting unit.

BACKGROUND ART

In light-emitting units such as backlight units of liquid crystal displays and electroluminescent light-emitting units, a light emitter may come into contact with oxygen or water vapor for a long period of time and the performance as a light emitter may thereby decrease. Therefore, these light-emitting units often use a barrier film laminate in which a gas barrier film provided with a gas barrier layer is laminated on a polymer film through an adhesive layer, as a protective film for the light emitter (see, for example, PTL1). Further, for example, PTL2 discloses a color conversion member (wavelength conversion sheet) having a structure in which the surfaces of both sides of two color conversion layers (phosphor layers) are sandwiched by barrier films.

CITATION LIST

[Patent Literature] PTL1: JP 2012-76288 A; PTL2: JP 2011-13567 A

SUMMARY OF THE INVENTION

Technical Problem

For mass production of the above mentioned barrier film laminate, a large scale production line is used. In a production line, for example, a barrier film unwound from a roll-shaped barrier film is conveyed, followed by being coated with an adhesive by a coating device. Then, another barrier film is bonded onto the film coated with the adhesive. In this kind of production line, the operation is often carried out continuously for a long period of time. Therefore, before operating the coating device, a large amount of adhesive is prepared in the coating device so that the operation can be carried out for a long period of time, and the adhesive is stored during operation.

In order to improve the adhesiveness of the barrier film, a silane coupling agent, a titanate coupling agent, and the like, may be added to the adhesive. The present inventors found that when a barrier film laminate is mass produced using an adhesive containing a silane coupling agent or a titanate coupling agent added thereto, a streaky unevenness may be observed on the barrier film laminate. When using this kind of barrier film laminate as a protective film of a light-emitting unit, there is a possibility that the luminous efficiency will decrease, the white balance will change, or light emission abnormalities (black dots or blue light transmission from the light source) will occur.

The present invention has been made in view of the above circumstances, and has a first object of providing a barrier film laminate capable of better preventing the generation of unevenness, even when mass producing using an adhesive containing a silane coupling agent added thereto, a method of producing the barrier film laminate, a wavelength conversion sheet, a backlight unit and an electroluminescent light-emitting unit obtained using the barrier film laminate.

As a means for better preventing the entry of oxygen or water vapor, films (hereinafter, referred to as the "barrier film") having gas barrier properties have been widely employed. The barrier film has a laminated structure including, for example, a substrate such as polyethylene terephthalate (PET) film, and a gas barrier layer laminated onto at least one surface of the substrate. When a barrier film is used in a light-emitting unit, the barrier film is required to have a high transparency in addition to the gas barrier properties in order to efficiently transmit the light from the light emitter through the barrier film. Further, as the barrier film is continuously exposed to heat from a light-emitting layer, the gas barrier film preferably maintains its transparency for a long period of time when exposed to a high temperature environment.

The present invention has been made in view of the above circumstances, and has a second object of providing a barrier film laminate having good gas barrier properties and transparency, and capable of maintaining transparency over a long period of time when exposed to a high temperature environment, a wavelength conversion sheet and a backlight unit obtained using the barrier film laminate.

Intended Solution to Problem

A first aspect of the present invention provides a barrier film laminate including a first barrier film that includes a first substrate layer and a first barrier layer formed on the first substrate layer, a second barrier film that includes a second substrate layer and a second barrier layer formed on the second substrate layer, and an adhesive layer. In the barrier film laminate, the first barrier film is bonded with the second barrier film so that the first barrier layer faces the second barrier layer through the adhesive layer, the first barrier layer includes a first inorganic thin film layer and a first gas barrier coating layer, the second barrier layer includes a second inorganic thin film layer and a second gas barrier coating layer, and the adhesive layer is formed of an adhesive containing an epoxy resin, a curing agent that has an amino group, a silane coupling agent that has an epoxy group or a silane coupling agent that has an amino group and two hydrolyzable functional groups.

The barrier film laminate can better prevent the generation of unevenness, even when mass producing the barrier film laminate using an adhesive that contains a silane coupling agent added thereto. Further, as the barrier film laminate has a laminate structure in which barrier films overlap, it is possible to better prevent the breakage of a light-emitting layer due to external force, and, improve the gas barrier properties when used in a light-emitting unit.

A second aspect of the present invention provides a method of producing a barrier film laminate including a step of preparing a first barrier film that includes a first substrate layer and a first barrier layer formed on the first substrate layer, and a second barrier film that includes a second substrate layer and a second barrier layer formed on the second substrate layer, a step of forming a coated film by applying an adhesive that contains an epoxy resin, a curing agent that has an amino group, a silane coupling agent that has an epoxy group or a silane coupling agent that has an amino group and two hydrolyzable functional groups onto a first barrier layer-side surface of the first barrier film, a step of bonding the first barrier film with the second barrier film so that the first barrier layer faces the second barrier layer through the coated film, and a step of curing the coated film.

Another aspect of the present invention provides a barrier film laminate including a first barrier film that has a first substrate and a first barrier layer formed on a first surface of the first substrate, a second barrier film that has a second substrate and a second barrier layer formed on a first surface of the second substrate, and a first adhesive layer that contains the reaction product of an epoxy compound and an amine compound. In the barrier film laminate, the first barrier film is bonded with the second barrier film so that the first barrier layer faces the second barrier layer through the first adhesive layer, and the amount of change $\Delta b^*$ of a color coordinate $b^*$ in a $L^*a^*b^*$ color system, before and after exposure for 1000 hours to the environment of an air temperature of 85° C., is 1.00 or less.

Since the barrier film laminate is made of the two barrier films bonded with each other with a first adhesive layer interposed therebetween, the first adhesive layer containing the reaction product of the epoxy compound and the amine compound, good gas barrier properties can be obtained. On the other hand, when the reaction product of the epoxy compound and the amine compound is used as the adhesive layer, the adhesive layer often turns yellow when exposed to a high temperature environment for a long period of time, and thus the transparency may deteriorate. However, since the barrier film laminate is made of two barrier films bonded with each other so that the barrier layers face with each other, it is possible to further reduce oxygen entry into the first adhesive layer. Therefore, the barrier film laminate has good gas barrier properties and transparency, and can maintain transparency over a long period of time even when exposed to a high temperature environment.

The barrier film laminate preferably further includes a second adhesive layer and a support substrate, and the support substrate is preferably bonded onto a second surface of the second substrate through the second adhesive layer. The barrier film laminate tends to reduce the generation of wrinkles due to heat and tension applied during production of the barrier film laminate by roll-to-roll processing. Further, the barrier film laminate tends to sufficiently reduce wrinkling of the barrier film laminate finally obtained, even if any wrinkles occur during the production of the first barrier film and the second barrier film.

In the barrier film laminate, both of the first barrier film and the second barrier film preferably have a water vapor transmission rate of 100 mg/(m²·day) or less. The barrier film laminate preferably further includes a coating layer, and the coating layer is preferably provided to serve as either of the outermost surfaces of the barrier film laminate.

In the barrier film laminate, the first barrier layer preferably includes the first inorganic thin film layer and the first gas barrier coating layer, and the second barrier layer preferably includes the second inorganic thin film layer and the second gas barrier coating layer. With this configuration of the barrier layer, gas barrier properties of the barrier film laminate tend to further improve.

The present invention further provides a wavelength conversion sheet including the barrier film laminate, and a phosphor layer formed on the first barrier film of the barrier film laminate. The present invention further provides a backlight unit including a light source, a light guide plate and the wavelength conversion sheet. The present invention still further provides an electroluminescent light-emitting unit including the barrier film laminate, and an electroluminescent light-emitting layer formed on the first barrier film of the barrier film laminate.

Desired Advantageous Effects of the Invention

One aspect of the present invention can provide a barrier film laminate capable of better preventing the generation of unevenness during mass production of the barrier film laminate by using an adhesive that contains a silane coupling agent added thereto, a method of producing the barrier film laminate, a wavelength conversion sheet, a backlight unit, and an electroluminescent light-emitting unit obtained using the barrier film laminate.

Another aspect of the present invention can provide a barrier film laminate having good gas barrier properties and transparency, and capable of maintaining transparency for a long period of time even when exposed to a high temperature environment, a wavelength conversion sheet, and a backlight unit obtained using the barrier film laminate.

DESCRIPTION OF REPRESENTATIVE EMBODIMENTS

Figure 1:
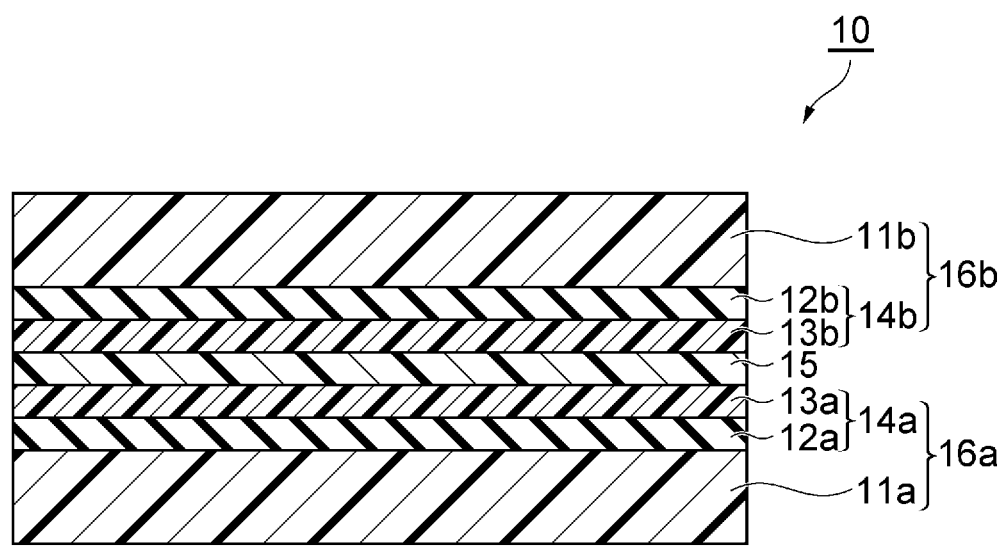
FIG. 1 is a schematic cross-sectional view illustrating a barrier film laminate according to one aspect of the present invention.

Embodiments of the present invention will be described in detail with reference to the accompanying drawings. With reference to the drawings, barrier films according to embodiments of the present invention will be described. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein

[First Aspect]

(Barrier Film Laminate)

FIG. 1 is a schematic cross-sectional view illustrating a barrier film laminate according to one aspect of the present invention. In FIG. 1, a barrier film laminate 10 includes a first barrier film 16a, a second barrier film 16b, and an adhesive layer 15. In the barrier film laminate 10, the first barrier film 16a is bonded with the second barrier film 16b through the adhesive layer 15.

The adhesive layer 15 preferably has an oxygen permeability of 1000 cm$^3$/(m$^2$·day·atm) or less in the thickness direction at a thickness of 5 μm. The oxygen permeability is more preferably 500 cm$^3$/(m$^2$·day·atm) or less, even more preferably 100 cm$^3$/(m$^2$·day·atm) or less, still more preferably 50 cm$^3$/(m$^2$·day·atm) or less, and most preferably 10 cm$^3$/(m$^2$·day·atm) or less. When the adhesive layer 15 is used in a light-emitting unit, the generation of dark spots in the vicinity of a defect is likely to be better prevented by the oxygen permeability of the adhesive layer 15 being 1000 cm$^3$/(m$^2$·day·atm) or less, even if the barrier layer has defects. The lower limit of the oxygen permeability is not particularly limited, but is, for example, 0.1 cm$^3$/(m$^2$·day·atm).

The adhesive layer 15 is formed of an adhesive containing an epoxy resin, a curing agent having an amino group, and a silane coupling agent having an epoxy group or a silane coupling agent having an amino group and two hydrolyzable functional groups. The barrier film can be firmly adhered by heating and curing the adhesive containing a thermosetting epoxy resin and the curing agent having the amino group.

Furthermore, the adhesion of the barrier film becomes stronger using the adhesive containing a silane coupling agent having the epoxy group as a functional group. Further, the adhesive is less likely to become cloudy even if stored for a long period of time after preparation, and unevenness in the barrier film laminate is less likely to be generated even if using the stored adhesive. It is considered that when using the silane coupling agent having the epoxy group, the dehydration reaction of the silane coupling agents in the adhesive is prevented, and the polymerization which may be the cause of the clouding is prevented, compared to when a silane coupling agent which does not have the epoxy group is used.

The adhesive contains a silane coupling agent having the amino group as the functional group, thereby the adhesion of the barrier film tends to become stronger, and the adhesive force of the barrier film in which the adhesive stored for a long period of time after preparation is used tends to become stable easily. Further, the silane coupling agent having the amino group further contains two hydrolyzable functional groups, thereby the adhesive is less likely to become cloudy after preparation even if stored for a long period of time, and appearance unevenness (appearance defect) in the barrier film laminate is less likely to be generated even if using the stored adhesive. It is considered that, when using a silane coupling agent having an amino group and two hydrolyzable functional groups, the dehydration reaction of the silane coupling agents in the adhesive is prevented, and the polymerization which may be the cause of the clouding is better prevented, compared to when a silane coupling agent having an amino group and three hydrolyzable functional groups is used. Further, by preventing the polymerization, it tends to be easy to maintain the adhesive force of the barrier film. Note that, when the silane coupling agent has two hydrolyzable functional groups, the adhesiveness of the barrier film can be easily obtained, compared to when the silane coupling agent has only one hydrolyzable functional group.

The silane coupling agent having an epoxy group may have the structure represented by the following formula (1).

$$Si(OR^1)_s(Ep)_t(R^2)_{4-s-t} \quad \cdots \quad (1)$$

In the formula (1), $R^1$ and $R^2$ are monovalent organic groups independently having 1 to 8 carbon atoms, preferably an alkyl group having 1 to 8 carbon atoms, and more preferably a alkyl group having 1 to 4 carbon atoms. By the carbon numbers of $R^1$ and $R^2$ being within the range mentioned above, the hydrolysis reactivity is high, and there is a tendency that better adhesion between the barrier films 16a and 16b can be obtained. Specifically, for $R^1$, as the carbon number decreases within the range mentioned above, the hydrolysis reactivity tends to increase. On the other hand, for $R^2$, as the carbon number increases within the range mentioned above, flexibility tends to be easily imparted to the adhesive layer. Ep is an organic group having an epoxy group. An example of the organic group includes alkyl group. When the organic group is an alkyl group, the alkyl group may have an epoxy group via an ether group. The carbon number of the organic group is preferably in the range of 2 to 10, more preferably in the range of 2 to 8, and even more preferably in the range of 4 to 6. S represents an integer from 1 to 4-t. t represents 1 or 2, and is preferably 1.

Examples of the silane coupling agent having an epoxy group include 3-glycidoxypropylmethyldimethoxysilane, 3-glycidoxypropylmethyldiethoxy silane, 3-glycidoxypropyltrimethoxysilane, 3-glycidoxypropyltriethoxy silane, 2-(3,4-epoxycyclohexyl)ethyltrimethoxysilane and the like.

The silane coupling agent having an amino group and two hydrolyzable functional groups may have the structure represented by the following formula (2).

$$Si(OR^3)_2(Am)_r(R^4)_{2-r} \quad \cdots \quad (2)$$

In the formula (2), $OR^3$ represents a hydrolyzable functional group. In the formula (2), $R^3$ and $R^4$ are monovalent organic groups independently having 1 to 8 carbon atoms, preferably an alkyl group having 1 to 8 carbon atoms, and more preferably an alkyl group having 1 to 4 carbon atoms. When $R^3$ is an alkyl group, the hydrolyzable functional group is an alkoxy group. By the carbon numbers of $R^3$ and $R^4$ being within the range mentioned above, the hydrolysis reactivity is high, a better adhesion between the barrier films 16a and 16b tends to be obtained. Specifically, for $R^3$, as the carbon number decreases within the range mentioned above, the hydrolysis reactivity tends to increase. On the other hand, for, $R^4$, as the carbon number increases within the range mentioned above, flexibility tends to be easily imparted to the adhesive layer. Am is an organic group having an amino group. Am may be a group ($-R^a NH_2$) having an organic group $R^a$ and an amino group bound to an organic group $R^a$, or may be a group ($-R^a NHR^b$) having the organic group $R^a$, an amino group bound to the organic group $R^a$ and a different organic group $R^b$ bound to the amino group, or may be a group ($-R^a NR^b R^c$) having the organic group $R^a$, the amino group bound to the organic group $R^a$, and different organic groups $R^b$ and $R^c$ bound to the amino group. Examples of the organic group $R^a$ include alkylene groups having 1 to 8 carbon atoms and the like.

Examples of the organic groups $R^b$ and $R^c$ include alkyl groups having 1 to 8 carbon atoms, phenyl group and the like. The organic groups $R^b$ and $R^c$ may be the same or different, and the organic groups $R^b$ and $R^c$ may be bonded together with the amino group as a double bond. The organic groups $R^a$, $R^b$ and $R^c$ may be further bonded to different amino groups. r represents 1 or 2, and is preferably 1.

Examples of the silane coupling agent having an amino group and two hydrolyzable functional groups include N-2-(aminoethyl)-3-aminopropylmethyldimethoxysilane, N-2-(aminoethyl)-3-aminopropylmethyldiethoxysilane, 3-aminopropyldimethoxysilane, N-2-(aminoethyl)-3-aminobutylmethyldimethoxysilane, N-2-(aminoethyl)-3-aminohexylmethyldimethoxysilane, and, N-2-(aminoethyl)-3-aminooctylmethyldimethoxysilane.

The content ratio (epoxy resin/curing agent (mass ratio of the non-volatile content)) of epoxy resin and the curing agent having the amino group in the adhesive is preferably 1.0 or less, more preferably in the range of 0.1 to 0.5, and even more preferably in the range of 0.1 to 0.35. By the adhesive containing the epoxy resin and the curing agent having the amino group being within the range mentioned above, the adhesiveness of the barrier film can be further easily obtained. Further, the content of the silane coupling agent having an epoxy group or a silane coupling agent having an amino group and two hydrolyzable functional groups in the adhesive (total amount of the non-volatile content) is preferably in the range of 5 to 20 mass %, and more preferably in the range of 7 to 15 mass %. By the content of the silane coupling agent in the adhesive being 5 mass % or more, the adhesiveness between the first barrier film 16a and the second barrier film 16b can be stably and easily obtained. Further, by the content of the silane coupling agent in the adhesive being 20 mass % or less, a better appearance tends to be obtained. The content ratio (epoxy resin/silane coupling agent (mass ratio of the non-volatile content)) of the epoxy resin and the silane coupling agent having an epoxy group or a silane coupling agent having an amino group and two hydrolyzable functional groups in the adhesive is preferably in the range of 1.0 to 20, more preferably in the range of 1.2 to 10, even more preferably in the range of 1.3 to 5.0, and most preferably in the range of 1.5 to 3.0. By the adhesive containing the epoxy resin and a silane coupling agent having an epoxy group or a silane coupling agent having an amino group and two hydrolyzable functional groups being within the range mentioned above, a barrier film laminate having good adhesiveness and little unevenness can easily be obtained.

The adhesive layer 15 preferably has a thickness in the range of 0.5 to 50 μm, more preferably in the range of 1 to 20 μm, and even more preferably in the range of 2 to 6 μm. By the thickness of the adhesive layer 15 being 0.5 μm or more, the adhesiveness between the first barrier film 16a and the second barrier film 16b can be easily obtained. Further, by the thickness of the adhesive layer 15 being 50 μm or less, the gas barrier properties can be easily obtained.

In FIG. 1, the first barrier film 16a includes a first substrate layer 11a and a first barrier layer 14a formed on the first substrate layer 11a, and the second barrier film 16b includes a second substrate layer 11b and a second barrier layer 14b formed on the second substrate layer 11b.

The first substrate layer 11a and the second substrate layer 11b are layers for better preventing breakage during processing, distribution, and the like. Examples of the first substrate layer 11a and the second substrate layer 11b include, but are not limited to polyesters such as polyethylene terephthalate, polybutylene terephthalate, and polyethylene naphthalate; polyamides such as nylon; polyolefins such as polypropylene and cycloolefin polymer; polycarbonates; and films such as triacetyl cellulose film. The first substrate layer 11a and the second substrate layer 11b are preferably polyester films, polyamide films, or polyolefin films, more preferably polyester films or polyamide films, and even more preferably polyethylene terephthalate films or polyethylene naphthalate films. Further, the first substrate layer 11a and the second substrate layer 11b are preferably biaxially oriented. The first substrate layer 11a and the second substrate layer 11b may be the same or different layers.

The thicknesses of the first substrate layer 11a and the second substrate layer 11b are not particularly limited, but both are preferably in the range of 3 μm or more and 100 μm or less, and more preferably in the range of 5 μm or more and 50 μm or less.

The first barrier layer 14a and the second barrier layer 14b are respectively formed on the first substrate layer 11a and the second substrate layer 11b with an anchor coat layer (not shown) interposed therebetween as necessary. The anchor coat layer may include a polyester resin and the like, and the thickness of the anchor coat layer is approximately in the range of 0.01 to 1 μm.

The first barrier film 16a is bonded with the second barrier film 16b so that the first barrier layer 14a faces the second barrier layer 14b. With this configuration, better gas barrier properties can be obtained, and the first barrier layer 14a and the second barrier layer 14b can be protected from external force. Accordingly, more stable gas barrier properties can be obtained.

The first barrier film 16a may contain two or more first barrier layers 14a, and the second barrier film 16b may contain two or more second barrier layers 14b. When the first barrier film 16a includes two or more first barrier layers 14a, the configuration of the plurality of first barrier layers 14a may be the same or different. When the second barrier film 16b includes two or more second barrier layers 14b, the configuration of the plurality of second barrier layers 14b may be the same or different. When using the barrier film laminate 10 in a light-emitting unit, the barrier film laminate 10 is disposed so that the first barrier film 16a contacts the light-emitting layer. By the barrier film laminate 10 being the barrier film laminate which overlaps with the first barrier film 16a and the second barrier film 16b, breakage of the light-emitting layer due to external force can be better prevented, and gas barrier properties can be improved when used in a light-emitting unit.

The first barrier layer 14a includes a first inorganic thin film layer 12a and a first gas barrier property coating layer 13a, and the first inorganic thin film layer 12a and the first gas barrier property coating layer 13a are laminated in this order on the first substrate layer 11a. The second barrier layer 14b contains a second inorganic thin film layer 12b and a second gas barrier coating layer 13b, and the second inorganic thin film layer 12b and the second gas barrier coating layer 13b are laminated in this order on the second substrate layer 11b.

The first inorganic thin film layer 12a and the second inorganic thin film layer 12b contain an inorganic compound, preferably a metal oxide. Examples of the metal oxide include oxides of metals such as aluminum, copper, silver, yttrium, tantalum, silicon and magnesium. The metal oxide is preferably silicon oxide ($SiO_x$, x is in the range of 1.0 to 2.0), because it is inexpensive, and have good barrier properties. When x is 1.0 or more, good gas barrier properties tend to be easily obtained.

The first inorganic thin film layer 12a and the second inorganic thin film layer 12b are preferably formed by vacuum film forming. Examples of the vacuum film forming include physical vapor deposition, chemical vapor deposition (CVD), and the like. Examples of the physical vapor deposition include vapor deposition, sputtering, ion plating, and the like. Further, examples of the chemical vapor deposition include heat CVD, plasma CVD, optical CVD, and the like. From the viewpoint of production cost, the first inorganic thin film layer 12a or the second inorganic thin film layer 12b is preferably an inorganic vapor deposition film layer formed by the vapor deposition.

The first inorganic thin film layer 12a and the second inorganic thin film layer 12b are preferably have a thickness in the range of 10 to 300 nm, and more preferably in the range of 20 to 100 nm. By the thicknesses of the first inorganic thin film layer 12a and the second inorganic thin film layer 12b being 10 nm or more, a uniform film can be easily obtained, and the gas barrier properties tends to be easily obtained. On the other hand, by the thicknesses of the first inorganic thin film layer 12a and the second inorganic thin film layer 12b being 300 nm or less, flexibility can be maintained in the first inorganic thin film layer 12a and the second inorganic thin film layer 12b, and there is a tendency that cracks in the film after film formation due to external force such as bending or tension are avoided.

The first gas barrier coating layer 13a and the second gas barrier coating layer 13b are preferably formed from a composition containing at least one selected from the group consisting of the metal alkoxide represented by the following formula (3) and the hydrolysate thereof.

$$M^1(OR^5)_m(R^6)_{n-m} \cdots \quad (3)$$

In the formula (3), $R^5$ and $R^6$ are monovalent organic groups independently having 1 to 8 carbon atoms, and are preferably alkyl groups such as methyl group or ethyl group. $M^1$ represents an n-valent metal atom such as Si, Ti, Al or Zr. m is an integer from 1 to n. Examples of the metal alkoxide include tetraethoxysilane [$Si(OC_2H_5)_4$], triisopropoxy aluminum [$Al(O\text{-}iso\text{-}C_3H_7)_3$] and the like. The metal alkoxides are preferably tetraethoxysilane or triisopropoxy aluminum, because they are comparatively stable in a water-based solvent after hydrolysis. Examples of the hydrolysates of metal alkoxide include silicic acid ($Si(OH)_4$) which is a hydrolysate of tetraethoxysilane, and aluminum hydroxide ($Al(OH)_3$) which is a hydrolysate of trispropoxy aluminum. These can be used singly or in a combination of two or more. The content of the metal alkoxide and hydrolysates thereof in the composition is, for example, in the range of 10 to 90 mass %.

The composition may further contain a hydroxyl group-containing polymer compound. Examples of the hydroxyl group-containing polymer compound include water soluble polymers such as polyvinyl alcohol, polyvinylpyrrolidone, and starches. The hydroxyl group-containing polymer compound is preferably polyvinyl alcohol from the viewpoint of the barrier properties. These can be used singly or in a combination of two or more. The content of the hydroxyl group-containing polymer compound in the composition is, for example, in the range of 10 to 90 mass %.

The first gas barrier coating layer 13a and the second gas barrier coating layer 13b preferably have a thickness in the range of 50 to 1000 nm, and more preferably in the range of 100 to 500 nm. When the first gas barrier coating layer 13a and the second gas barrier coating layer 13b have a thickness of 50 nm or more, the layers are more likely to obtain sufficient gas barrier properties. When the first gas barrier coating layer 13a and the second gas barrier coating layer 13b have a thickness of 1000 nm or less, the layers are more likely to maintain sufficient flexibility.

The barrier film laminate 10 may further include a coating layer (not shown) on the surface of the second barrier film 16b side to exhibit a light scattering function. The barrier film laminate 10 includes the coating layer, thereby an interference fringe (Moire) prevention function, an anti-reflection function, and the like can be obtained in addition to the light scattering function.

The barrier film laminate 10 can be suitably used as a protective film (light-emitter protective film) for the light emitter which would deteriorate by contact with oxygen or water vapor. The light emitter may be a phosphor such as quantum dots, an electroluminescent light emitter and the like.

A method of producing a barrier film laminate according to the present embodiment will be explained. First, the first barrier film 16a and the second barrier film 16b are prepared. The method of producing the first barrier film 16a and the second barrier film 16b is as described above. Next, the adhesive is applied onto the surface of the first barrier layer 14a side of the first barrier film 16a (or the second barrier layer 14b side of the second barrier film 16b), to form coated film. The application method of the adhesive includes reverse gravure coating and the like. If a cloudy adhesive is applied by these application methods, doctor blade streaks are likely to be developed, and thus there is a possibility that the adhesive may not be applied to the doctor streaks, which may cause partial separation between barrier films, and may result in appearance defects (streaky unevenness). The coated film may be dried as necessary. The drying temperature is approximately in the range of 70 to 130° C., or preferably approximately in the range of 80 to 130° C., and the drying time is approximately in the range of 10 to 60 seconds. Then, the first barrier film 16a is bonded with the second barrier film 16b so that the first barrier layer 14a faces the second barrier layer 14b through the coated film. By heating and curing the coated film after being bonded, the coated film becomes the adhesive layer 15, and thus the barrier film laminate 10 can be produced. The heating (aging) temperature for curing the coated film is, for example, in the range of 40 to 160° C., and the heating time is, for example, in the range of 1 to 4 days.

In the present embodiment, the adhesive has a silane coupling agent having an epoxy group or a silane coupling agent having an amino group and two hydrolyzable functional groups. Therefore, clouding can be better prevented regardless of the drying temperature of the adhesive, and, a stable adhesiveness of the barrier film can be obtained.

(Wavelength Conversion Sheet)

Figure 2:
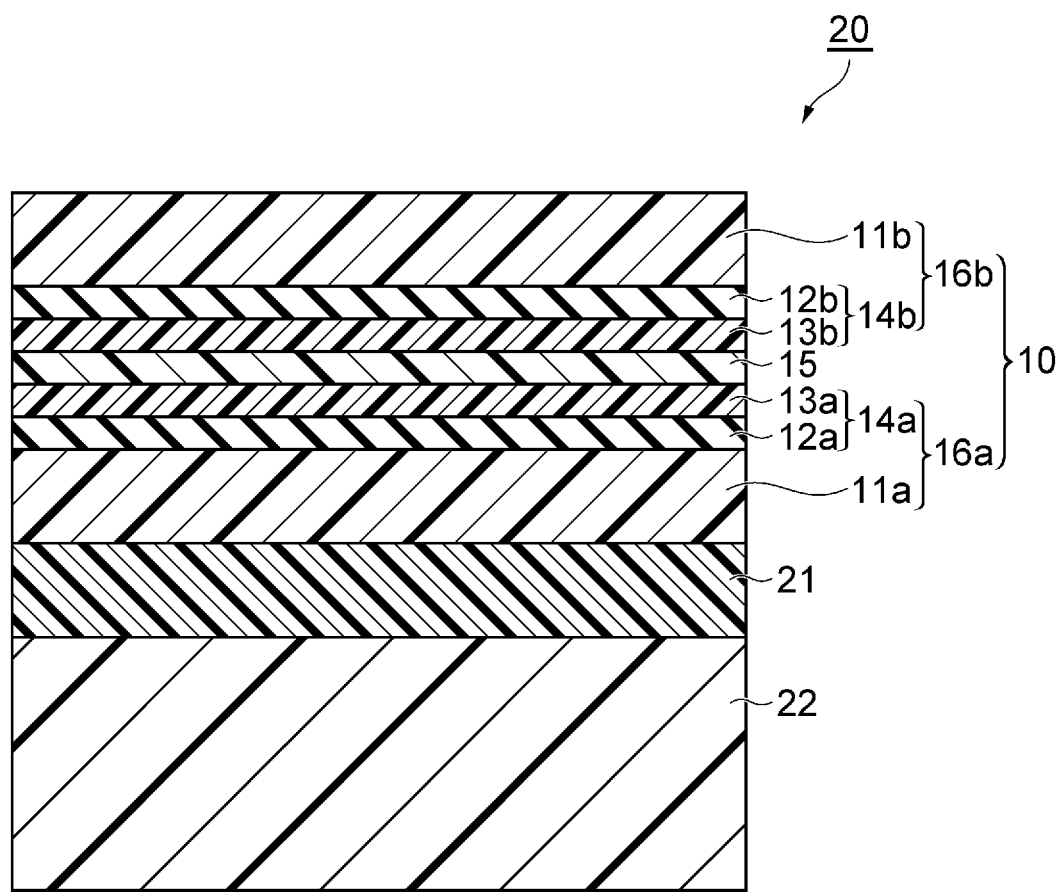
FIG. 2 is a schematic cross-sectional view illustrating a wavelength conversion sheet according to one aspect of the present invention.

FIG. 2 is a schematic cross-sectional view illustrating a wavelength conversion sheet according to one aspect of the present invention. The wavelength conversion sheet is a sheet capable of converting the wavelength of part of light from the light source of the backlight unit for a liquid crystal display. As shown in FIG. 2, a wavelength conversion sheet 20 is generally configured with a first protective film, a phosphor layer 21 formed on the first protective film, and a second protective film 22 formed on the phosphor layer 21. The wavelength conversion sheet 20 has a structure in which the phosphor layer 21 is wrapped (that is, sealed) between the first protective film and the second protective film 22. In FIG. 2, as the first protective film, the aforementioned barrier film laminate 10 is used. On the hand, as the second protective film 22, the aforementioned barrier film laminate 10 or another protective film may be used. Further, the wavelength conversion sheet 20 does not necessarily have the second protective film 22. Namely, the wavelength conversion sheet 20 includes the barrier film laminate 10, and the phosphor layer 21 formed on the first barrier film 16a of the barrier film laminate 10.

The phosphor layer 21 contains a resin and a phosphor. The thickness of the phosphor layer 21 is in the range of several tens to hundreds μm. Examples of the resin include a photocurable resin or a thermosetting resin. The phosphor layer 21 preferably contains two kinds of phosphors composed of quantum dots. Further, the phosphor layer 21 may be a laminate of 2 or more phosphor layers having a phosphor layer containing one kind of a phosphor and a phosphor layer containing another kind of a phosphor. The two kinds of phosphors are selected from those having the same excitation wavelength. The excitation wavelength is selected based on the wavelength of light emitted from the light source of the backlight unit. The fluorescent colors of the two or more types of phosphors are different from each other. When a blue light-emitting diode (blue light LED) is used in the light source, the fluorescent colors are red and green. Each fluorescence wavelength and the wavelength of light emitted from the light source are selected based on the spectral characteristics of the color filter. The fluorescent peak wavelength is, for example, 610 nm for red, and 550 nm for green.

Next, the particle structure of the phosphor will be described. As the phosphor, core-shell quantum dots having a good luminous efficiency are particularly preferable. In the core-shell quantum dots, a semiconductor crystal core as a light-emitting part is coated with a shell as a protective film. Examples of materials used for the core include cadmium selenide (CdSe), and examples of materials used for the shell include zinc sulfide (ZnS). When surface imperfections of the CdSe particles are coated with ZnS having a large band gap, quantum yield is improved. The phosphors may be formed with the cores thereof being double-coated with a first shell and a second shell. In this case, the core can be CdSe, the first shell can be zinc selenide (ZnSe), and the second shell can be ZnS.

The phosphor layer 21 may have a monolayer configuration in which all the phosphors are dispersed in a single layer, or it may have a multilayer configuration in which each phosphor is separately dispersed in a plurality of layers and the layers are laminated.

Next, with reference to FIG. 2, the method of producing the wavelength conversion sheet 20 of the present embodiment will be described. The method of forming the phosphor layer 21 is not particularly limited, and an example thereof includes the method described in the specification of JP 2013-544018 A. The wavelength conversion sheet 20 can be produced by dispersing a phosphor in the binder resin, applying the prepared phosphor dispersion on the surface of the first barrier film 16a side of the first protective film (barrier film laminate 10), and then bonding the second protective film 22 onto the coated surface, and curing the phosphor layer 21. Alternatively, the wavelength conversion sheet 20 can be produced by coating the phosphor dispersion on a first surface of the second protective films 22, bonding the barrier film laminate 10 onto the coated surface so that the first barrier film 16a faces the phosphor layer 21, and curing the phosphor layer 21.

[Second Aspect]
(Light-Emitter Protective Film)

Figure 3:
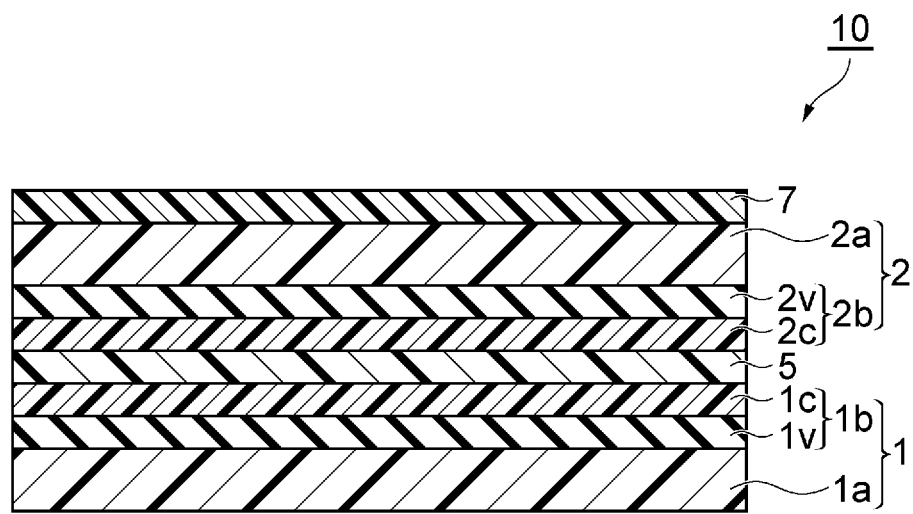
FIG. 3 is a schematic cross-sectional view illustrating a barrier film laminate according to another aspect of the present invention.

FIG. 3 is a schematic cross-sectional view illustrating the barrier film laminate according to another aspect of the present invention. The barrier film laminate can be suitably used as a protective film (light-emitter protective film) for the light emitter which could be deteriorated due to contact with oxygen or water vapor. Hereinafter, the barrier film laminate may be referred to as the light-emitter protective film. In FIG. 3, a light-emitter protective film 10 includes the first barrier film 1, the second barrier film 2 and the first adhesive layer 5, and the first barrier film 1 is bonded with the second barrier film 2 through the first adhesive layer 5. On the surface opposite to the first barrier film 1 of the second barrier film 2, a coating layer 7 is provided as necessary. The light-emitter protective film 10 includes two barrier films, and thus, high gas barrier properties can be obtained. Further, in the present embodiment, the first adhesive layer 5 contains the reaction product of the epoxy compound and the amine compound. The first adhesive layer 5 can obtain not only adhesion between the barrier films but also better gas barrier properties compared with the adhesive layer obtained using other materials.

The first barrier film 1 has a first substrate 1a and a first barrier layer 1b formed on a first surface of the first substrate 1a, the second barrier film 2 has a second substrate 2a and a second barrier layer 2b formed on a first surface of the second substrate 2a, and the first barrier layer 1b faces the second barrier layer 2b. In other words, the first adhesive layer 5 is disposed so as to be adjacent to both of the first barrier layer 1b and the second barrier layer 2b, and is sandwiched by these barrier layers. When a different layer is disposed between the first barrier layer 1b or the second barrier layer 2b and the first adhesive layer 5, there is a possibility that oxygen slightly enters from the end portion of another layer and is supplied to the adhesive layer. However, in the light-emitter protective film 10 having the layer configuration, the slight entry of oxygen can also be better prevented. As a result, the yellowing of the first adhesive layer 5 can be better prevented, in other words, the yellowing of the entirety of the light-emitter protective film 10 can be better prevented. and it is possible to maintain a sufficiently high transparency as a light-emitter protective film even in the case when exposed for a long period of time to a high temperature environment. The amount of change Δb* of the color coordinate b* in the L*a*b* color system of the light-emitter protective film before and after exposing the light-emitter protective film 10 having such a configuration to a temperature of 85° C. in air (1 atm) for 1000 hours, can be 1.00 or less. The amount of change Δb* is preferably 0.50 or less, more preferably 0.30 or less, and even more preferably 0.10 or less. By the amount of change Δb* being within the range mentioned above, the light-emitter protective film 10 can maintain transparency over a long period of time even when exposed to a high temperature environment. Note that, the L*a*b* color system is a color system standardized by the International Commission on Illumination (CIE).

The first substrate 1a and the second substrate 2a respectively form the first barrier layer 1b and the second barrier layer 2b, and can better prevent breakage during processing, distribution, and the like. From the viewpoint of the transparency of the light-emitter protective film 10, the total light transmittance of the first substrate 1a and the second substrate 2a is preferably 85% or more. Examples of such a substrate include, but are not limited to: polyesters such as polyethylene terephthalate, polybutylene terephthalate, and polyethylene naphthalate; polyamides such as nylon; polyolefins such as polypropylene and cycloolefin; polycarbonates; and triacetyl cellulose. Further, the first substrate 1a and the second substrate 2a are preferably biaxially oriented. The thicknesses of the first substrate 1a and the second substrate 2a are preferably in the range of 9 to 100 µm, and more preferably in the range of 12 to 50 µm. When the substrates 1a and 2a have a thickness of 9 µm or more, the strength of the substrates 1a and 2a can be sufficiently ensured. When the first substrate 1a and the second substrate 2a have a thickness of 100 µm or less, long rolls (the rolls of barrier films 1 and 2) can be efficiently and economically produced.

The first substrates 1a and the second substrate 2a may have the same or different thickness. From the viewpoint of decreasing the thickness of the wavelength conversion sheet, the thickness of the first substrate 1a on the side closer to the light-emitting layer may be thinner than the second substrate 2a on the side further from the light-emitting layer. Water vapor and gases mainly permeate from the surface of the wavelength conversion sheet. Therefore, it is possible to decrease the thickness of the entire wavelength conversion sheet by relatively increasing the thickness of the second substrate 2a to better prevent the permeation of water vapor and oxygen from the surface, while relatively decreasing the thickness of the first substrate 1a. As the permeation of water vapor and oxygen occurs not only from the surface of the barrier films 1 and 2, but also from the end surfaces, the entry of water vapor and oxygen from the end surfaces can be better prevented when the thickness of the first substrate 1a is thinner. The first substrate 1a preferably has a thickness of 40 µm or less.

The first barrier layer 1b and the second barrier layer 2b are respectively formed on the first substrate 1a and the second substrate 2a with an anchor coat layer (not shown) interposed therebetween as necessary. The anchor coat layer may include a polyester resin and the like, and the thickness of the anchor coat layer is approximately in the range of 0.01 to 1 µm.

The first barrier layer 1b preferably includes a first inorganic thin film layer 1v and the first gas barrier coating layer 1c. Namely, the first barrier layer 1b has a configuration in which the first inorganic thin film layer 1v is provided on a first surface of the first substrate 1a, and the first gas barrier coating layer 1c is provided on the first inorganic thin film layer 1v. The second barrier layer 2b preferably includes a second inorganic thin film layer 2v and a second gas barrier coating layer 2c. Namely, the second barrier layer 2b has a configuration in which the second inorganic thin film layer 2 is provided on a first surface of the second substrate 2a, and the second gas barrier coating layer 2c is provided on the second inorganic thin film layer 2v.

The inorganic thin film layers 1v and 2v are not particularly limited, but aluminum oxide, silicon oxide, magnesium oxide, or a mixture thereof may be used. Among these, aluminum oxide or silicon oxide is preferably used in view of barrier properties and productivity.

The inorganic thin film layers 1v and 2v preferably contain an inorganic compound and a metal oxide. Examples of the metal oxide include oxides of metals such as aluminum, copper, silver, yttrium, tantalum, silicon and magnesium. The metal oxide is preferably silicon oxide ($SiO_x$, x is in the range of 1.0 to 2.0), because it is inexpensive, and has good barrier properties. When x is 1.0 or more, good gas barrier properties tend to be easily obtained.

From the view point of the production cost, the inorganic thin film layers 1v and 2v are preferably inorganic vapor deposition film layers formed by vapor deposition. When the inorganic thin film layers 1v and 2v are inorganic vapor deposition film layers, holes may develop in the inorganic thin film layers 1v and 2v due to the scattering (splashes) of the deposition material. Even though the splashes occur less frequently, the holes developed due to splashes are relatively large defects, and these holes can be holes which pass through the substrates 1a and 2a. Therefore, a protective film having holes due to splashes can have entrance passages for oxygen. Specifically, when holes are developed in the first substrate 1a and the first inorganic thin film layer 1v disposed on the side close to the light-emitting layer, dark spots are likely to be generated in the light-emitting layer in the vicinity of the hole. However, for the first adhesive layer 5 as described later that has an oxygen permeability of 1000 $cm^3/(m^2 \cdot day \cdot atm)$ or less, the generation of dark spots is likely to be better prevented in the same manner as the case where there are no defects even if there are relatively large defects described above. Therefore, by the first inorganic thin film layer 1v being an inorganic vapor deposition film layer, and the oxygen permeability of the first adhesive layer 5 being 1000 $cm^3/(m^2 \cdot day \cdot atm)$ or less, the production cost is reduced while easily better preventing the generation of dark spots.

The thicknesses (film thickness) of the inorganic thin film layers 1v and 2v are preferably in the range of 5 to 500 nm, and more preferably in the range of 10 to 100 nm. When the film thickness is 5 nm or more, a uniform film is more likely to be formed, and the layer is more likely to have sufficient gas barrier properties. Alternatively, when the film thickness is 500 nm or less, the inorganic thin film layer is more likely to maintain sufficient flexibility, occurrence of cracks in the thin layer after film formation due to external factors such as bending or tension is more likely to be more reliably better prevented. The first inorganic thin film layer 1v and the second inorganic thin film layer 2v may have the same or different thickness.

The first gas barrier coating layer 1c and the second gas barrier coating layer 2c are provided to better prevent various kinds of secondary damage in the subsequent processes, and to impart high barrier properties. The gas barrier coating layers 1c and 2c preferably contain a component which includes at least one selected from the group consisting of hydroxyl group-containing polymer compound, metal alkoxide, metal alkoxide hydrolysate and metal alkoxide polymer in view of obtaining good barrier properties.

Examples of the hydroxyl group-containing polymer compound include water soluble polymers such as polyvinyl alcohol, polyvinylpyrrolidone, and starches. The hydroxyl group-containing polymer compound is preferably polyvinyl alcohol from the viewpoint of the barrier properties. These can be used singly or in a combination of two or more.

Examples of the metal alkoxide include compounds represented by the formula (4).

$$M^2(OR^7)_p(R^8)_{q-p} \cdots \qquad (4)$$

In the formula (4), $R^7$ and $R^8$ are monovalent organic groups independently having 1 to 8 carbon atoms, and are preferably alkyl groups such as methyl group or ethyl group. $M^2$ represents a q-valent metal atom such as Si, Ti, Al and Zr. p is an integer from 1 to q. Examples of the metal alkoxide include tetraethoxysilane [$Si(OC_2H_5)_4$], triisopropoxy aluminum [$Al(O\text{-}iso\text{-}C_3H_7)_3$] and the like. The metal alkoxides are preferably tetraethoxysilane or triisopropoxy aluminum, because they are comparatively stable in a water-based solvent after hydrolysis. Examples of the hydrolysates of metal alkoxide include silicic acid ($Si(OH)_4$) which is a hydrolysate of tetraethoxysilane, and aluminum hydroxide ($Al(OH)_3$) which is a hydrolysate of trispropoxy aluminum. These can be used singly or in a combination of two or more.

The thicknesses (film thickness) of the gas barrier coating layers 1c and 2c are preferably in the range 50 to 1000 nm, and more preferably in the range of 100 to 500 nm. When the film thickness is 50 nm or more, the layer is more likely to obtain sufficient gas barrier properties. When the film thickness is 1000 nm or less, the thin layer is more likely to maintain sufficient flexibility. The first gas barrier coating layer 1c and the second gas barrier coating layer 2c may have the same or different thickness.

The barrier film 1 and 2 preferably has a water vapor transmission rate of 100 mg/(m²·day) or less, and more preferably 50 mg/(m²·day) or less. By the water vapor transmission rate of the barrier films 1 and 2 being 100 mg/(m²·day) or less, much better gas barrier properties are likely to be obtained.

The first adhesive layer 5 is obtained by curing a thermosetting adhesive containing an epoxy compound and an amine compound, and includes the reaction product of the epoxy compound and the amine compound. In the light-emitter protective film 10 provided with the first adhesive layer 5 obtained as described above, higher gas barrier properties can be obtained. The first adhesive layer 5 preferably has an oxygen permeability of 1000 cm³/(m²·day·atm) or less in the thickness direction at a thickness of 5 μm. The oxygen permeability is more preferably 500 cm³/(m²·day·atm) or less, and even more preferably 100 cm³/(m²·day·atm) or less, still more preferably 50 cm³/(m²·day·atm) or less, and most preferably 10 cm³/(m²·day·atm) or less. When the first adhesive layer 5 is used in a light-emitting unit, the generation of dark spots in the vicinity of a defect is likely to be better prevented by the oxygen permeability of the first adhesive layer 5 being 1000 cm³/(m²·day·atm) or less, even if the barrier film has defects. The lower limit of the oxygen permeability is not particularly limited, but is, for example, 0.1 cm³/(m²·day·atm).

The first adhesive layer 5 preferably has a thickness in the range of 0.5 to 50 μm, more preferably in the range of 1 to 20 μm, and even more preferably in the range 2 to 6 μm. When the thickness of the first adhesive layer 5 is 0.5 μm or more, adhesiveness can be easily obtained between the first barrier film 1 and the second barrier film 2. When the thickness of the first adhesive layer 5 is 50 μm or less, better gas barrier properties and transparency can be easily obtained.

The coating layer (matte layer) 7 is provided on a second surface of the second substrate 2a to exhibit one or more optical functions, antistatic functions or scratch prevention functions, and is the outermost surface of the light-emitter protective film 10. Examples of the optical function include, but are not limited to, an interference fringe (moire) prevention function, an antireflection function, a diffusion function, and the like. Among these, the coating layer 7 preferably has at least interference fringe prevention as an optical function. In the present embodiment, the following description will be provided for the case where the coating layer 7 has at least an interference fringe prevention function.

The coating layer 7 is configured to include, for example, a binder resin and fine particles. Further, fine irregularities may be produced on the surface of the coating layer 7 since the fine particles are embedded in the binder resin so that the fine particles are partially protruded from the surface of the coating layer 7. Thus, the occurrence of interference fringes such as Newton's rings is better prevented by providing the coating layers 7 on the surface of the side opposite to the light-emitting layer.

The binder resin is not particularly limited, and resins having good optical transparency may be used. More specific examples include polyester resins, acrylic resins, acrylic urethane resins, polyester acrylate resins, polyurethane acrylate resins, urethane resins, epoxy resins, polycarbonate resins, polyamide resins, polyimide resins, melamine resins, and phenol resins. The binder resin may also be any of thermoplastic resins, thermosetting resins, and ionizing radiation curable resins. Among these, an acrylic resin having high light resistance and good optical properties is desirably used. These can be used singly or in a combination of two or more.

Examples of the fine particles that can be used include, but are not limited to, inorganic fine particles, such as silica, clay, talc, carbonic acid calcium, sulfuric acid calcium, barium sulfate, titanium oxide, alumina, and the like, as well as organic fine particles, such as a styrene resin, urethane resin, silicone resin, acrylic resin, and the like. These can be used singly or in a combination of two or more.

The mean particle diameter of fine particles is preferably in the range of 0.1 to 30 μm, and more preferably in the range of 0.5 to 10 μm. When the mean particle diameter of fine particles is 0.1 μm or more, a high interference fringe prevention function is more likely to be obtained. When the mean particle diameter of fine particles is 30 μm or less, improved transparency is more likely to be obtained. The content of the fine particles in the coating layer 7 is preferably in the range of 0.5 to 30 mass %, and more preferably in the range of 3 to 10 mass % to the total amount of the coating layer 7. When the content of the fine particles is 0.5 mass % or more, improved light diffusion and interference fringe prevention are more likely to be obtained. When the content of the fine particles is 30 mass % or less, the reduction of brightness is sufficiently prevented.

Figure 4:
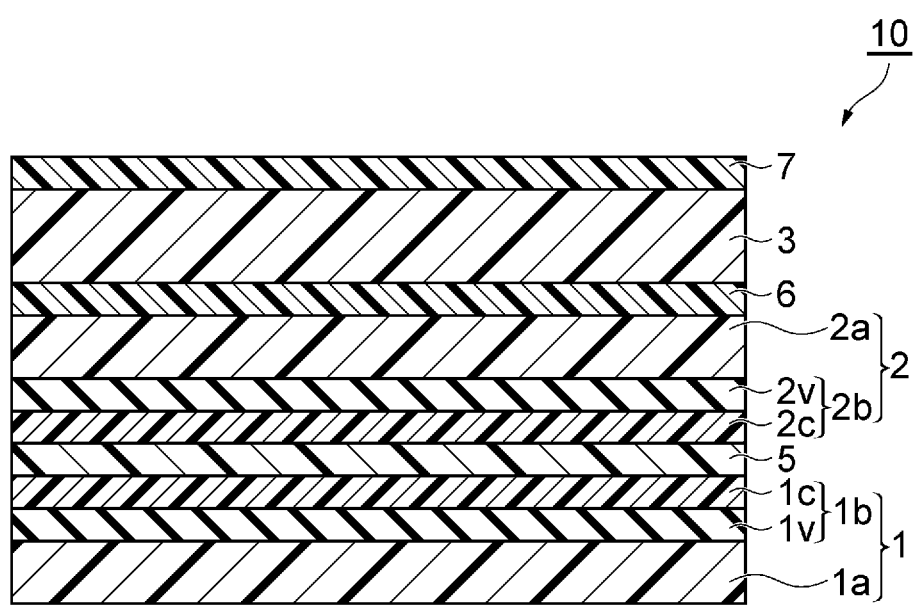
FIG. 4 is a schematic cross-sectional view illustrating the barrier film laminate according to another aspect of the present invention.

As shown in FIG. 4, the light-emitter protective film 10 may further include a second adhesive layer 6 and a support substrate 3. In FIG. 4, the support substrate 3 is bonded onto a second surface of the second substrate 2a through the second adhesive layer 6, so that the coating layer 7 is formed on the support substrate 3 and becomes the outermost surface. The light-emitter protective film 10 includes the support substrate 3, thereby generation of wrinkles due to heat and tension applied during production of the light-emitter protective film 10 by roll-to-roll processing is likely to be reduced. Further, even if wrinkles are generated during the production of the first barrier film and the second barrier film, the wrinkles are likely to be finally reduced.

The support substrate 3 is preferably formed of substrates having a total light transmittance of 85% or higher, but is not limited thereto. For example, polyethylene terephthalate film, polyethylene naphthalate film, or the like may be used as a substrate having high transparency and high heat resistance. The support substrate 3 preferably has a thickness in the range of 10 to 250 μm, more preferably in the range of 25 to 240 μm, even more preferably in the range of 40 to 210 μm, and particularly preferably in the range of 55 to 200 μm. When the thickness of the support substrate 3 is 10 μm or more, the strength of the support substrate 3 for obtaining the effect which improves the wrinkles of the light-emitter protective film 10 is sufficiently and easily ensured. When the thickness of the support substrate 3 is 250 μm or less, the total thickness of the wavelength conversion sheet can be easily better prevented from becoming excessively thick.

As shown in FIG. 4, the second adhesive layer 6 is provided between the barrier film 2 and the support substrate 3 in order to bond the barrier film 2 with the support substrate 3 as a laminate. As the adhesive for producing the second adhesive layer 6, acrylic adhesives, epoxy adhesives, urethane-adhesives and the like may be used. As the pressure-sensitive adhesive for producing the second adhesive layer 6, acrylic pressure-sensitive adhesive, polyvinyl ester pressure-sensitive adhesives, urethane pressure-sensitive adhesives, silicone pressure-sensitive adhesives, starch adhesives and the like may be used. The pressure-sensitive adhesive is preferably an acrylic pressure-sensitive adhesive. By using an acrylic pressure-sensitive adhesive, the transparency of the second adhesive layer 6 is easily maintained for a long period of time. The second adhesive layer 6 preferably has a thickness in the range of 0.5 to 50 µm, more preferably in the range of 1 to 20 µm, and even more preferably in the range of 2 to 6 µm. When the thickness of the second adhesive layer 6 is 0.5 µm or more, the adhesiveness between the barrier film 2 and the support substrate 3 is easily obtained. When the thickness of the second adhesive layer 6 is 50 µm or less, better gas barrier properties can be easily obtained.

Next, a method of producing the light-emitter protective film 10 will be described. First, the barrier films 1 and 2 are produced by, for example, roll-to-roll processing. Specifically, the inorganic thin film layer 1v is laminated on a first surface of the first substrate 1a by, for example, vapor deposition or the like. Then, a coating agent is applied on the surface of the inorganic thin film layer 1v and dried at, for example, 80 to 250° C., to form the gas barrier coating layer 1c. The coating agent is made of an aqueous solution or water/alcohol mixture solution as a base agent containing at least one selected from the group consisting of hydroxyl group-containing polymer compound, metal alkoxide, metal alkoxide hydrolysate, and metal alkoxide polymer. Thus, the first barrier film 1 having the first barrier layer 1b (inorganic thin film layer 1v and gas barrier coating layer 1c) disposed on a first surfaces of the first substrate 1a is obtained. By performing the same operation as above, the second barrier film 2 having the barrier layer 2b (inorganic thin film layer 2v and gas barrier coating layer 2c) disposed on a first surface of the second substrate 2a can be obtained.

Note that the anchor coat layer may be provided between the substrate and the inorganic thin film layer in order to improve the adhesiveness between the substrate and the inorganic thin film layer laminated onto the surface of the substrate. The anchor coat layer can be formed by applying a solution containing the abovementioned resins on the substrate, followed by drying and curing at, for example, 50 to 200° C. The thickness of the anchor coat layer is preferably in the range of 5 to 500 nm, and more preferably in the range of 10 to 100 nm.

After respectively producing the first barrier film 1 and the second barrier film 2, the laminate film is produced by bonding these films with the first adhesive layer 5. Specifically, the laminate film can be obtained by bonding the barrier film 1 with the barrier film 2 using an adhesive (or a pressure-sensitive adhesive) constituting the first adhesive layer 5 so that the barrier layer 1b of the first barrier film 1 faces the barrier layer 2b of the second barrier film 2 by using a laminating apparatus that uses roll-to-roll processing, followed by drying the adhesive.

Furthermore, the laminate film may be bonded with the support substrate 3. Specifically, the laminate film is bonded with the support substrate 3 by using an adhesive (or pressure-sensitive adhesive) constituting the second adhesive layer 6 so that the second substrate 2a of the laminate film faces the support substrate 3 by using a laminating apparatus that uses roll-to-roll processing. The protective film can be obtained by drying the adhesive.

Then, the coating layer 7 is formed on one surface of the protective film (for example, on the surface of the support substrate 3) by the roll-to-roll processing, as necessary. Specifically, a coating solution prepared by mixing a binder resin, fine particles, and a solvent as necessary is applied on one surface of the protective film (for example, on the surface of the support substrate 3), followed by being dried to form the coating layer 7. Thus, a protective film provided with a coating layer is obtained. The light-emitter protective film 10 can be obtained as described above.

(Wavelength Conversion Sheet)

Figure 5:
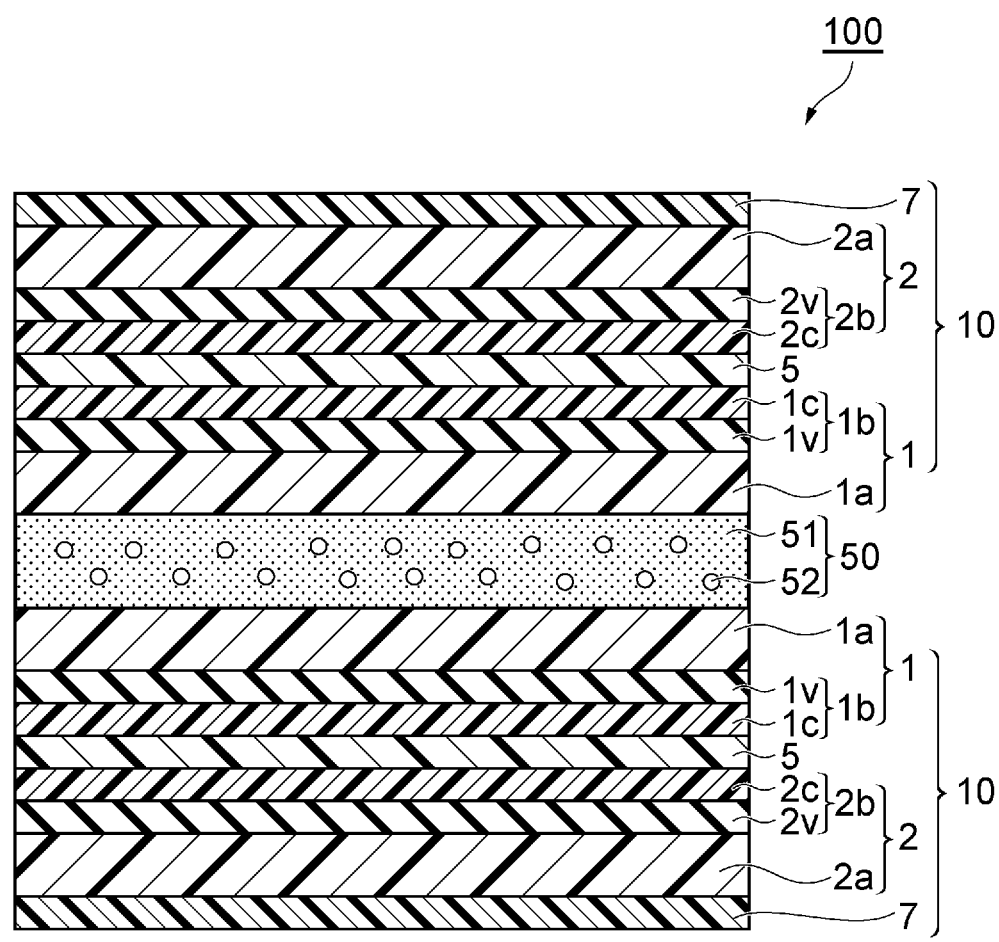
FIG. 5 is a schematic cross-sectional view illustrating a wavelength conversion sheet according to another aspect of the present invention.

FIG. 5 is a schematic cross-sectional view illustrating the wavelength conversion sheet according to another aspect of the present invention. The wavelength conversion sheet is a sheet capable of converting the wavelength of part of light from the light source of the backlight unit for a liquid crystal display. In FIG. 5, the wavelength conversion sheet 100 includes a phosphor layer 50, and the emitter protective films 10 and 10 provided on a first surface side and a second surface side of the phosphor layer 50 as the first protective film and the second protective film, respectively. Namely, the light-emitter protective film 10, the phosphor layer 50 and the light-emitter protective film 10 are laminated in this order. The wavelength conversion sheet 100 has a structure in which the phosphor layer 50 is wrapped (that is, sealed) between the pair of light-emitter protective films 10 and 10. The pair of light-emitter protective films 10 and 10 is disposed so that the respective first barrier films face the phosphor layer 50 side.

As shown in FIG. 5, the phosphor layer 50 is a thin film having a thickness of several tens to several hundreds of µm, and containing a sealing resin 51 and a phosphor 52. A mixture of one or more types of phosphors 52 is sealed in the sealing resin 51. In lamination of the phosphor layer 50 and the pair of light-emitter protective films 10 and 10, the sealing resin 51 serves to join them and fill a gap therebetween. The phosphor layer 50 may be a laminate of two or more phosphor layers, each of which seals only one type of phosphors 52. For two or more types of phosphors 52 used in such one or more phosphor layers, those having the same excitation wavelength are selected. The excitation wavelength is selected based on the wavelength of light emitted from a light source L. The fluorescent colors of the two or more types of phosphors 52 are different from each other. When a blue light-emitting diode (blue light LED) is used in the light source, the fluorescent colors are red and green. Each fluorescence wavelength and the wavelength of light emitted from the light source are selected based on the spectral characteristics of the color filter. The fluorescent peak wavelength is, for example, 610 nm for red, and 550 nm for green.

Usable examples of the sealing resin 51 include thermoplastic resins, thermosetting resins, and ultraviolet curing resins. These resins may be used singly or in combination of two or more.

Examples of thermoplastic resins include cellulose derivatives, such as acetyl cellulose, nitrocellulose, acetyl butyl cellulose, ethyl cellulose, and methyl cellulose; vinyl-based resins, such as vinyl acetate and copolymers thereof, vinyl chloride and copolymers thereof, and vinylidene chloride and copolymers thereof; acetal resins, such as polyvinyl formal and polyvinyl butyral; acrylic-based resins, such as acrylic resins and copolymers thereof, and methacrylic resins and copolymers thereof; polystyrene resins; polyamide resins; linear polyester resins; fluororesins; polycarbonate resins; and the like. Examples of thermosetting resins include phenol resins, urea melamine resins, polyester resins, silicone resins, and the like. Examples of ultraviolet-curing resins include photopolymerizable prepolymers, such as epoxy acrylate, urethane acrylate, and polyester acrylate. Furthermore, such a photopolymerizable prepolymer can be used as a main component, and a monofunctional or multifunctional monomer can be used as a diluent.

Quantum dots are preferably used as the phosphors 52. Examples of quantum dots include those in which a core as a light-emitting part is covered with a shell as a protective film. The core is, for example, cadmium selenate (CdSe) or the like, and the above shell is, for example, zinc sulfide (ZnS) or the like. Surface defects of CdSe particles are coated with ZnS, which has a large bandgap, to thereby improve the quantum efficiency. Moreover, the phosphors 52 may be those in which a core is doubly coated with a first shell and a second shell. In this case, the core can be CdSe, the first shell can be zinc selenide (ZnSe), and the second shell can be ZnS. Further, phosphors 52 other than quantum dots may be YAG:Ce or the like.

The phosphors 52 have a mean particle diameter preferably in the range of 1 to 20 nm. Further, the phosphor layer 50 preferably has a thickness in the range of 1 to 500 µm. The content of the phosphors 52 in the phosphor layer 50 is preferably in the range of 1 to 20 mass %, and more preferably in the range of 3 to 10 mass %, relative to the total amount of the phosphor layer 50.

Note that, in the embodiment of the wavelength conversion sheet 100, the light-emitter protective film 10 is provided on both surfaces of the phosphor layer 50, but may be provided on only a first surface of the phosphor layer 50. Namely, the light-emitter protective film 10 may be provided on a first surface of the phosphor layer 50 as the first protective film, and another protective film may be provided on a second surface as the second protective film.

The method of producing the wavelength conversion sheet 100 is not particularly limited, and the following methods may be mentioned. For example, the wavelength conversion sheet 100 can be produced by dispersing the phosphor 52 in the sealing resin 51, applying the prepared phosphor dispersion on the surface of the first barrier film 1 side of the light-emitter protective film 10, and then bonding the other emitter protective film 10 to the coated surface, followed by curing the phosphor layer 50.

[Backlight Unit]

Figure 6:
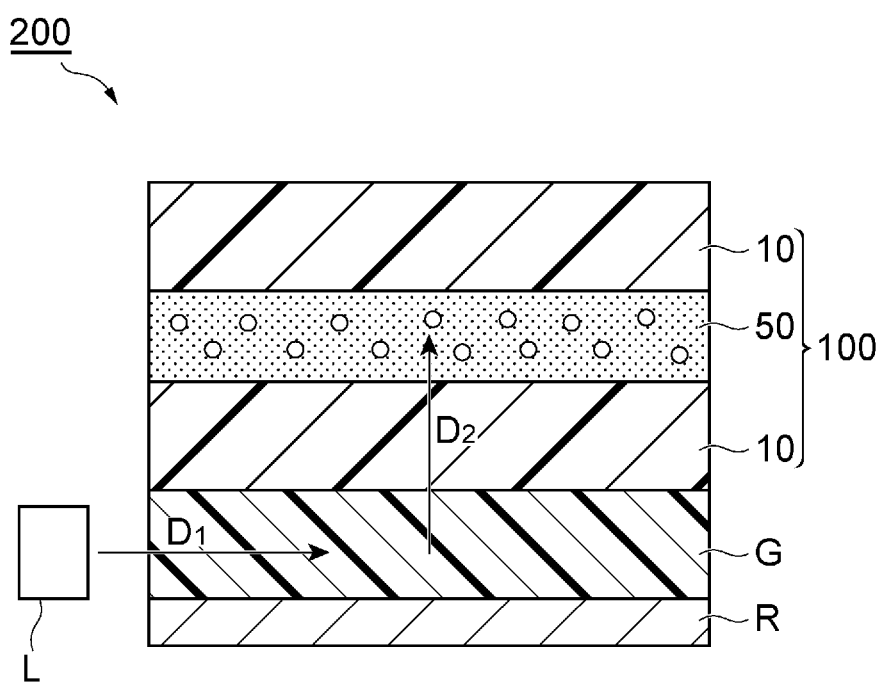
FIG. 6 is a schematic cross-sectional view illustrating a backlight unit according to one embodiment of the present invention.

The backlight unit can be obtained using the wavelength conversion sheets 20 and 100. FIG. 6 is a schematic cross-sectional view illustrating a backlight unit obtained using the wavelength conversion sheet 100. In FIG. 6, a backlight unit 200 includes a light source L and the wavelength conversion sheet 100. In the wavelength conversion sheet 100, the barrier film laminates 10 are disposed on the side opposite to the light source L, with the phosphor layer 50 interposed therebetween. In detail, in the backlight unit 200, the wavelength conversion sheet 100, a light guide plate G and a reflecting plate R are disposed in this order, and a light source L is disposed on a lateral side of the light guide plate G (in a planar direction of the light guide plate G). The thickness of the light guide plate G is, for example, in the range of 100 to 1000 µm.

The light guide plate G and the reflecting plate R serve to efficiently guide light emitted from the light source L, and may be made of known materials. The light guide plate G may be made of, for example, an acrylic film, a polycarbonate film, or a cycloolefin film. The light source L is provided with a plurality of, for example, blue light-emitting diodes. These light-emitting diodes may also be violet light-emitting diodes, or light-emitting diodes of a shorter wavelength. The light emitted from the light source L is incident on the light guide plate G (in the D1 direction), and then, while being reflected and refracted, is incident on the phosphor layer 50 (in the D2 direction). The light becomes white light after passing through the phosphor layer 50 because the light which has not passed through the phosphor layer 50 is mixed with yellow light generated in the phosphor layer 50.

[Electroluminescent Light-Emitting Unit]

Figure 7:
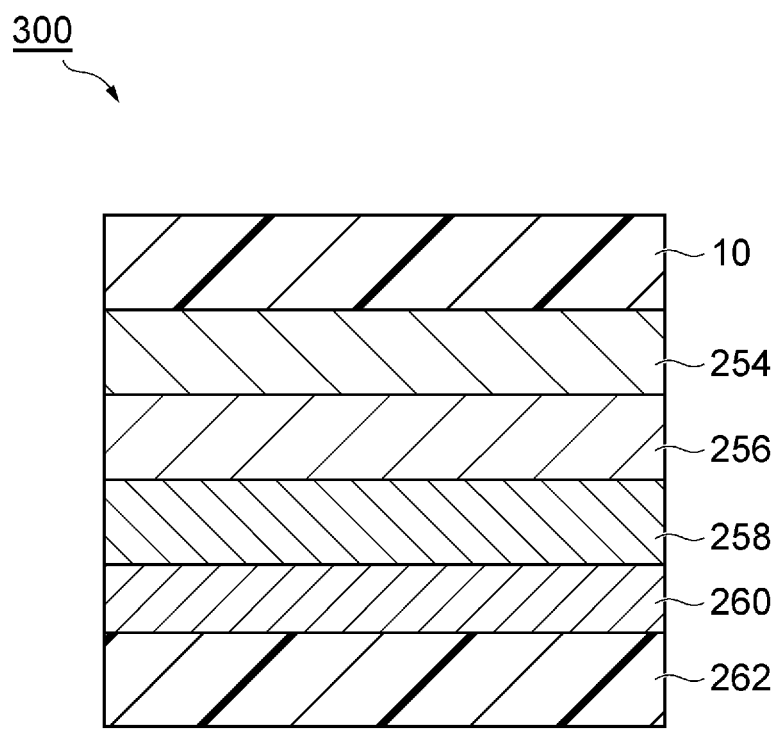
FIG. 7 is a schematic cross-sectional view illustrating an electroluminescent light-emitting unit according to one embodiment of the present invention.

FIG. 7 is a schematic cross-sectional view illustrating an electroluminescent light-emitting unit according to one embodiment of the present invention. An electroluminescent light emitting unit 300 according to the present invention includes an electroluminescent light-emitting layer 256 and the barrier film laminate 10. The electroluminescent light-emitting unit 300 can be obtained by, for example, sandwiching and hermetically sealing electrode elements with the first protective film and a second protective film 262. The electrode elements include a transparent electrode layer 254, an electroluminescent light-emitting layer 256 provided on the transparent electrode layer 254, a dielectric layer 258 provided on the electroluminescent light-emitting layer 256, and a back surface electrode layer 260 provided on the dielectric layer 258. In the electroluminescent light-emitting unit, the aforementioned barrier film laminate 10 can be used as the first protective film. The electroluminescent light-emitting layer 256 is formed on the first barrier films 1 and 16a of the barrier film laminate 10.

Even in an electroluminescent light-emitting unit, it is considered that dark spots are generated by a mechanism similar to that described for the wavelength conversion sheet. The electroluminescent light-emitting unit 300 according to the present embodiment can better prevent the generation of dark spots, using the barrier film laminate 10 as a protective film provided on an electrode element including the electroluminescent light-emitting layer 256, even if the barrier film laminate 10 has defects in the barrier layer.

The electrode layers, the electroluminescent light-emitting layer and the dielectric layer can be formed, for example, by vapor deposition, sputtering, and the like, using well-known materials.

EXAMPLES

The present invention will be specifically described by way of examples. However, the scope of the present invention should not be construed as being limited to these examples.

[Preparation of Barrier Film Laminate]

Example 1-1

The acrylic polyol was mixed with tolylene diisocyanate so that the number of NCO groups in the tolylene diisocyanate becomes equivalent to the number of OH groups in the acrylic polyol, followed by being diluted with ethyl acetate so that the total solid content was 5 mass %. To the mixed solution after dilution, β-(3,4-epoxycyclohexyl)trimethoxysilane was further added in an amount of 5 mass % relative to the total solid content, and these compounds were mixed to prepare an anchor coat layer composition.

Using bar coating, the anchor coat layer composition was applied on one surface of the biaxially oriented polyethylene terephthalate film (first substrate layer, thickness: 25 µm), followed by being dried and cured at 100° C. for one minute to form an anchor coat layer having a thickness of 50 nm.

Using an electron beam heating vacuum deposition apparatus, a silicon oxide material (SiO, manufactured by Canon Optron Inc.) was evaporated by electron beam heating under a pressure of $1.5\times10^{-2}$ Pa, thereby forming an $SiO_x$ film (first inorganic thin film layer) having a thickness of 30 nm on the anchor coat layer. The acceleration voltage during vapor deposition was 40 kV, and the emission current was 0.2 A.

Next, 10.4 parts by mass of tetraethoxysilane was mixed with 89.6 parts by mass of hydrochloric acid (normal concentration: 0.1 N), followed by stirring the mixture for 30 minutes, to obtain a hydrolyzed solution of tetraethoxysilane. Also, polyvinyl alcohol was dissolved in a mixed solvent of water and isopropyl alcohol (water/isopropyl alcohol (mass ratio)=90:10) to obtain 3 mass % of a polyvinyl alcohol solution. 60 parts by mass of the hydrolyzed solution of tetraethoxysilane was mixed with 40 parts by mass of the polyvinyl alcohol solution to obtain a gas barrier coating layer composition.

The gas barrier coating layer composition was applied and dried on the first inorganic thin film layer to form a first gas barrier coating layer having a thickness of 300 nm. Furthermore, a different first inorganic thin film layer having a thickness of 30 nm was formed on the first gas barrier coating layer in the same manner as above, and a different first gas barrier coating layer having a thickness of 300 nm was formed on the different first inorganic thin film layer. As described above, a first barrier film was obtained by laminating the first substrate layer, the anchor coat layer, the first inorganic thin film layer, the first gas barrier coating layer, the first inorganic thin film layer, and the first gas barrier coating layer in this order.

Using bar coating, the anchor coat layer composition was applied on one surface of the biaxially oriented polyethylene terephthalate film (second substrate layer, thickness: 25 µm), followed by being dried and cured at 100° C. for one minute to form an anchor coat layer having a thickness of 50 nm.

Using an electron beam heating vacuum deposition apparatus, a silicon oxide material (SiO, manufactured by Canon Optron Inc.) was evaporated by electron beam heating under a pressure of $1.5\times10^{-2}$ Pa, thereby forming an $SiO_x$ film (second inorganic thin film layer) having a thickness of 30 nm on the anchor coat layer. The acceleration voltage during vapor deposition was 40 kV, and the emission current was 0.2 A.

The gas barrier coating layer composition was applied and dried on the second inorganic thin film layer to form a second gas barrier coating layer having a thickness of 300 nm. As described above, a second barrier film was obtained by laminating the second substrate layer, the anchor coat layer, the second inorganic thin film layer, and the second gas barrier coating layer in this order.

5 parts by mass of epoxy resin-based main agent (manufactured by Mitsui Gas Chemical Company, Inc., Tradename: M-100), 23 parts by mass of amine curing agent (manufactured by Mitsui Gas Chemical Company, Inc., Tradename: C-93, non-volatile content: 65 mass %), and, 2 parts by mass of a silane coupling agent having an epoxy group (3-glycidoxypropylmethyldimethoxysilane, Tradename: KBM-402 manufactured by Shin-Etsu Chemical Co., Ltd.) were dissolved in a solvent of 23 parts by mass of methanol and 47 parts by mass of ethyl acetate, to prepare an adhesive. The types of functional groups of the silane coupling agent used in the preparation of the adhesive, and the content of the adhesive (total amount of non-volatile content) are shown in Table 1.

The adhesive for which six hours had passed since preparation was applied and dried on the surface of the first gas barrier coating layer of the obtained first barrier film using a reverse gravure apparatus, and then the second barrier film was bonded so that the surface coated with an adhesive A faces the second gas barrier coating layer, followed by being aged at 50° C. for two days. As described above, the first barrier film is bonded with the second barrier film with the adhesive layer having a thickness of 5 µm interposed therebetween, to prepare a barrier film laminate.

Example 1-2

A barrier film laminate was prepared in the same manner as Example 1-1 except that the addition amount of the silane coupling agent was changed from 2 parts by mass to 3 parts by mass in the preparation of the adhesive. The types of functional groups of the silane coupling agent used in the preparation of the adhesive, and the content of the adhesive (total amount of non-volatile content) are shown in Table 1.

Example 1-3

A barrier film laminate was prepared in the same manner as Example 1-1 except that a silane coupling agent (3-gycidoxypropyl methyldiethoxysilane, Tradename: KBE-402 manufactured by Shin-Etsu Chemical Co., Ltd.) was used in place of the silane coupling agent (3-gycidoxypropyl methyldimethoxysilane, Tradename: KBM-402 manufactured by Shin-Etsu Chemical Co., Ltd.) in the preparation of the adhesive. The types of functional groups of the silane coupling agent used in the preparation of the adhesive, and the content of the adhesive (total amount of non-volatile content) are shown in Table 1.

Example 1-4

A barrier film laminate was prepared in the same manner as Example 1-3 except that the addition amount of the silane coupling agent was changed from 2 parts by mass to 3 parts by mass in the preparation of the adhesive. The types of functional groups of the silane coupling agent used in the preparation of the adhesive, and the content of the adhesive (total amount of non-volatile content) are shown in Table 1.

Example 1-5

A barrier film laminate was prepared in the same manner as Example 1-1 except that a silane coupling agent (3-glycidoxypropyltrimethoxysilane, Tradename: KBM-403 manufactured by Shin-Etsu Chemical Co., Ltd.) was used in place of the silane coupling agent (3-gycidoxypropyl methyldimethoxysilane, Tradename: KBM-402 manufactured by Shin-Etsu Chemical Co., Ltd.) in the preparation of the adhesive. The types of functional groups of the silane coupling agent used in the preparation of the adhesive, and the content of the adhesive (total amount of non-volatile content) are shown in Table 1.

Example 1-6

A barrier film laminate was prepared in the same manner as Example 1-5 except that the addition amount of the silane coupling agent was changed from 2 parts by mass to 3 parts by mass in the preparation of the adhesive. The types of functional groups of the silane coupling agent used in the preparation of the adhesive, and the content of the adhesive (total amount of non-volatile content) are shown in Table 1.

Example 1-7

A barrier film laminate was prepared in the same manner as Example 1-1 except that a silane coupling agent (3-glycidoxypropyltriethoxysilane, Tradename: KBE-403 manufactured by Shin-Etsu Chemical Co., Ltd.) was used in place of the silane coupling agent (3-gycidoxypropyl methyldimethoxysilane, Tradename: KBM-402 manufactured by Shin-Etsu Chemical Co., Ltd.) in the preparation of the adhesive. The types of functional groups of the silane coupling agent used in the preparation of the adhesive, and the content of the adhesive (total amount of non-volatile content) are shown in Table 1.

Example 1-8

A barrier film laminate was prepared in the same manner as Example 1-7 except that the addition amount of the silane coupling agent was changed from 2 parts by mass to 3 parts by mass in the preparation of the adhesive. The types of functional groups of the silane coupling agent used in the preparation of the adhesive, and the content of the adhesive (total amount of non-volatile content) are shown in Table 1.

Comparative Example 1-1

A barrier film laminate was prepared in the same manner as Example 1-1 except that a silane coupling agent (N-2-(aminoethyl)-3-aminopropyltrimethoxysilane, Tradename: KBM-603 manufactured by Shin-Etsu Chemical Co., Ltd.) was used in place of the silane coupling agent (3-glycidoxypropylmethyldimethoxysilane, Tradename: KBM-402 manufactured by Shin-Etsu Chemical Co., Ltd.) in the preparation of the adhesive. The types of functional groups of the silane coupling agent used in the preparation of the adhesive, and the content of the adhesive (total amount of non-volatile content) are shown in Table 1.

Comparative Example 1-2

A barrier film laminate was prepared in the same manner as Comparative Example 1-1 except that the addition amount of the silane coupling agent was changed from 2 parts by mass to 3 parts by mass in the preparation of the adhesive. The types of functional groups of the silane coupling agent used in the preparation of the adhesive, and the content of the adhesive (total amount of non-volatile content) are shown in Table 1.

Comparative Example 1-3

A barrier film laminate was prepared in the same manner as Example 1-1 except that a silane coupling agent (3-aminopropyltriethoxysilane, Tradename: KBE-903 manufactured by Shin-Etsu Chemical Co., Ltd.) was used in place of the silane coupling agent (3-glycidoxypropylmethyldimethoxysilane, Tradename: KBM-402 manufactured by Shin-Etsu Chemical Co., Ltd.) in the preparation of the adhesive. The types of functional groups of the silane coupling agent used in the preparation of the adhesive, and the content of the adhesive (total amount of non-volatile content) are shown in Table 1.

Example 1-9

The acrylic polyol was mixed with tolylene diisocyanate so that the number of NCO groups in the tolylene diisocyanate becomes equivalent to the number of OH groups in the acrylic polyol, followed by being diluted with ethyl acetate so that the total solid content was 5 mass %. To the mixed solution after dilution, β-(3,4-epoxycyclohexyl)trimethoxysilane was further added in an amount of 5 mass % relative to the total solid content, and these compounds were mixed to produce an anchor coat layer composition.

Using bar coating, the anchor coat layer composition was applied on one surface of the biaxially oriented polyethylene terephthalate film (first substrate layer, thickness: 25 µm), followed by drying and curing at 100° C. for one minute to form an anchor coat layer having a thickness of 50 nm.

Using an electron beam heating vacuum deposition apparatus, a silicon oxide material (SiO, manufactured by Canon Optron Inc.) was evaporated by electron beam heating under a pressure of $1.5 \times 10^{-2}$ Pa, thereby forming an $SiO_x$ film (first inorganic thin film layer) having a thickness of 30 nm on the anchor coat layer. The acceleration voltage during vapor deposition was 40 kV, and the emission current was 0.2 A.

Next, 10.4 parts by mass of tetraethoxysilane was mixed with 89.6 parts by mass of hydrochloric acid (normal concentration: 0.1 N), followed by stirring the mixture for 30 minutes, to obtain a hydrolyzed solution of tetraethoxysilane. Also, polyvinyl alcohol was dissolved in a mixed solvent of water and isopropyl alcohol (water/isopropyl alcohol (mass ratio)=90:10) to obtain 3 mass % of a polyvinyl alcohol solution. 60 parts by mass of the hydrolyzed solution of tetraethoxysilane was mixed with 40 parts by mass of the polyvinyl alcohol solution to obtain a gas barrier coating layer composition.

The gas barrier coating layer composition was applied and dried on the first inorganic thin film layer to form a first gas barrier coating layer having a thickness of 300 nm. Furthermore, a different first inorganic thin film layer having a thickness of 30 nm was formed on the first gas barrier coating layer in the same manner as above, and a different first gas barrier coating layer having a thickness of 300 nm was formed on the different first inorganic thin film layer. As described above, a first barrier film was obtained by laminating the first substrate layer, the anchor coat layer, the first inorganic thin film layer, the first gas barrier coating layer, the first inorganic thin film layer, and the first gas barrier coating layer in this order.

Using bar coating, the anchor coat layer composition was applied on one surface of the biaxially oriented polyethylene terephthalate film (second substrate layer, thickness: 25 µm), followed by being dried and cured at 100° C. for one minute to form an anchor coat layer having a thickness of 50 nm.

Using an electron beam heating vacuum deposition apparatus, a silicon oxide material (SiO, manufactured by Canon Optron Inc.) was evaporated by electron beam heating under a pressure of $1.5 \times 10^{-2}$ Pa, thereby forming an $SiO_x$ film (second inorganic thin film layer) having a thickness of 30 nm on the anchor coat layer. The acceleration voltage during vapor deposition was 40 kV, and the emission current was 0.2 A.

The gas barrier coating layer composition was applied and dried on the second inorganic thin film layer to form a second gas barrier coating layer having a thickness of 300 nm. As described above, a second barrier film was obtained by laminating the second substrate layer, the anchor coat layer, the second inorganic thin film layer, and the second gas barrier coating layer in this order.

5 parts by mass of epoxy resin main agent (manufactured by Mitsui Gas Chemical Company, Inc., Tradename: M-100), 23 parts by mass of an amine curing agent (manufactured by Mitsui Gas Chemical Company, Inc., Tradename: C-93, non-volatile content: 65 mass %), and, 2 parts by mass of a silane coupling agent having an amino group and two hydrolyzable functional groups (N-2-(aminoethyl)-3-aminopropylmethyldimethoxysilane, Tradename: KBM- 602 manufactured by Shin-Etsu Chemical Co., Ltd.) were dissolved in a solvent containing 23 parts by mass of methanol and 47 parts by mass of ethyl acetate to prepare an adhesive. The types of functional groups of the silane coupling agent and the number of hydrolyzable functional groups used in the preparation of the adhesive, and, the content of the adhesive (total amount of non-volatile content) are shown in Table 2.

The adhesive for which six hours had passed since preparation was applied and dried at 82° C. for one minute on the surface of the first gas barrier coating layer of the obtained first barrier film using a reverse gravure device, the second barrier film was bonded so that the coated surface of the adhesive faces the second gas barrier coating layer, followed by being aged at 50° C. for two days. As described above, the first barrier film is bonded with the second barrier film with the adhesive layer having a thickness of 5 μm interposed therebetween, to prepare a barrier film laminate.

Example 1-10

A barrier film laminate was prepared in the same manner as Example 1-9 except that the addition amount of the silane coupling agent was changed from 2 parts by mass to 3 parts by mass in the preparation of the adhesive. The types of functional groups of the silane coupling agent and the number of hydrolyzable functional groups used in the preparation of the adhesive, and, the content of the adhesive (total amount of non-volatile content) are shown in Table 2.

Comparative Example 1-4

A barrier film laminate was prepared in the same manner as Example 1-9 except that a silane coupling agent (N-2-(aminoethyl)-3-aminopropyltrimethoxysilane, Tradename: KBM-603 manufactured by Shin-Etsu Chemical Co., Ltd.) was used in place of the silane coupling agent (N-2-(aminoethyl)-3-aminopropylmethyldimethoxysilane, Tradename: KBM-602 manufactured by Shin-Etsu Chemical Co., Ltd.) in the preparation of the adhesive. The types of functional groups of the silane coupling agent and the number of hydrolyzable functional groups used in the preparation of the adhesive, and, the content of the adhesive (total amount of non-volatile content) are shown in Table 2.

Comparative Example 1-5

A barrier film laminate was prepared in the same manner as Comparative Example 1-4 except that the addition amount of the silane coupling agent was changed from 2 parts by mass to 3 parts by mass in the preparation of the adhesive. The types of functional groups of the silane coupling agent and the number of hydrolyzable functional groups used in the preparation of the adhesive, and, the content of the adhesive (total amount of non-volatile content) are shown in Table 2.

Comparative Example 1-6

A barrier film laminate was prepared in the same manner as Example 1-9 except that a silane coupling agent (3-aminopropyltriethoxysilane, Tradename: KBE-903 manufactured by Shin-Etsu Chemical Co., Ltd.) was used in place of the silane coupling agent (N-2-(aminoethyl)-3-aminopropylmethyldimethoxysilane, Tradename: KBM-602 manufactured by Shin-Etsu Chemical Co., Ltd.) in the preparation of the adhesive. The types of functional groups of the silane coupling agent and the number of hydrolyzable functional groups used in the preparation of the adhesive, and, the content of the adhesive (total amount of non-volatile content) are shown in Table 2.

[Appearance of Adhesive]

The adhesives prepared in Examples 1-1 to 1-10 and Comparative Examples 1-1 to 1-6 were maintained at room temperature, and the change in the appearance accompanying the elapsed time of the adhesive was evaluated visually according to the following criteria. The evaluation results of the appearance of the adhesive are shown in Tables 1 and 2.

A: Cloudiness was not observed in the adhesive six hours after preparation.

B: Cloudiness was not observed in the adhesive two hours after preparation, but cloudiness was observed in the adhesive six hours after preparation.

C: Cloudiness was not observed in the adhesive thirty minutes after preparation, but cloudiness was observed in the adhesive two hours after preparation.

D: Cloudiness was not observed in the adhesive immediately after preparation, but cloudiness was observed in the adhesive thirty minutes after preparation.

[Appearance of Barrier Film Laminate]

The appearance of the barrier film laminate prepared in the Examples and the Comparative Examples was evaluated visually according to the following criteria. The evaluation results of the appearance of the barrier film laminate are shown in Table 1.

A: Unevenness was not observed in the barrier film laminate.

B: Streak-shaped partial separations were generated between the barrier films, and a streaky unevenness was observed in the barrier film laminate.

TABLE 1

| | Functional group | Content (mass %) | Adhesive Appearance | Barrier film Laminate appearance |
|---|---|---|---|---|
| Example 1-1 | Epoxy group | 2 | A | A |
| Example 1-2 | | 3 | A | A |
| Example 1-3 | | 2 | A | A |
| Example 1-4 | | 3 | A | A |
| Example 1-5 | | 2 | A | A |
| Example 1-6 | | 3 | A | A |
| Example 1-7 | | 2 | A | A |
| Example 1-8 | | 3 | A | A |
| Comparative Example 1-1 | Amino group | 2 | C | B |
| Comparative Example 1-2 | | 3 | D | B |
| Comparative Example 1-3 | | 2 | D | B |

TABLE 2

| | Functional group | Number of hydrolyzable functional groups | Content (mass %) | Adhesive Appearance | Barrier film Laminate appearance |
|---|---|---|---|---|---|
| Example 1-9 | Amino group | 2 | 9.1 | A | A |
| Example 1-10 | | | 13.1 | A | A |
| Comparative Example 1-4 | Amino group | 3 | 9.1 | C | B |
| Comparative Example 1-5 | | | 13.1 | D | B |
| Comparative Example 1-6 | | | 9.1 | D | B |

Cloudiness was not observed in the adhesives prepared in Examples 1-1 to 1-8, even if six hours had passed since preparation, and defects in the appearance were not observed even in the barrier film laminates obtained using these adhesives. On the other hand, cloudiness was observed in the adhesives prepared in Comparative Examples 1-1 to 1-3 within six hours after preparation, and a streaky unevenness was observed even in the barrier film laminates obtained using these adhesives.

Cloudiness was not observed in the adhesives prepared in Examples 1-9 and 1-10, even if six hours had passed since preparation, and defects in the appearance were not observed even in the barrier film laminate obtained using these adhesives. On the other hand, cloudiness was observed in the adhesives prepared in Comparative Examples 1-4 to 1-6 within six hours after preparation, and a streaky unevenness was observed even in the barrier film laminates obtained using these adhesives.

[Adhesiveness]

The barrier film laminates obtained by Example 1-1, Example 1-9, Comparative Example 1-1, and Comparative Example 1-4 were each cut into strips of 1 cm width, and the first barrier film side of the barrier film laminate was fixed onto a glass plate. Using a Tensilon tensile tester (manufactured by Orientec Co., Ltd.), the second barrier film of the fixed strips of the barrier film laminates were each peeled off from the first barrier film in a direction perpendicular to the glass plate at a speed of 300 mm/minute, to measure the strength required for peeling. The strength was measured in an environment at a temperature of 23° C. and a humidity of 65% RH.

The peel strength of the barrier film laminate obtained by Example 1-1 was 7 N/cm or more and the substrate was broken, whereas the peel strength of the barrier film laminate obtained by Comparative Example 1-1 was 5 N/cm. In the barrier film laminates obtained in Example 1-9, the adhesiveness of the barrier film was high, and the barrier film broke before peeling, whereas the peeling of the barrier film was possible in the barrier film laminate obtained by Comparative Example 1-4, and the peel strength was 5 N/cm.

[Preparation of Light-Emitter Protective Film]

Example 2-1

The barrier film was prepared as described below by the roll-to-roll processing. First, silicon oxide was provided as the inorganic thin film layer at a thickness of 30 nm by vacuum deposition on one surface of a polyethylene terephthalate (PET) film having a thickness of 30 μm as the substrate, and furthermore, a gas barrier coating layer having a thickness of 300 nm was formed on the inorganic thin film layer. The gas barrier coating layer was formed by applying the coating solution containing tetraethoxysilane and a polyvinyl alcohol by wet coating. Thus, a barrier film having a barrier layer made up of the inorganic thin film layer and the gas barrier coating layer disposed on one of the surfaces of the substrate was obtained. A barrier film roll having the same configuration as this barrier film was separately prepared. The water vapor transmission rate of the obtained barrier films was 50 mg/(m$^2$·day) when measured using a method in conformance with the infrared sensor method of JIS K 7129. A water vapor transmission rate measurement device (product name: Permatran, manufactured by Mocon Inc.) was used for the measurement of the water vapor transmission rate. The temperature of a transmission cell was set to 40° C., the relative humidity of a high-humidity chamber was set to 90% RH, and the relative humidity of a low-humidity chamber was set to 0% RH.

The two barrier films obtained as described above were bonded to each other. A two-part epoxy adhesive containing an epoxy resin main agent and an amine curing agent was used for the bonding, an adhesive layer (oxygen permeability: 5 cm$^3$/(m$^2$·day·atm)) in which the film thickness after curing is 5 μm was formed, and a film laminated so that the gas barrier coating layers of the two barrier films face each other was prepared. Note that, the oxygen permeability of the adhesive layer was measured as described above. The aforementioned two-part epoxy adhesive film was formed on an oriented polypropylene (OPP) film (oxygen permeability: 3000 cm$^3$/(m$^2$·day·atm) (measurement limit) or more) having a thickness of 20 μm so that the film thickness after curing was 5 the samples for evaluation were prepared, and a differential pressure gas measurement device (GTR-10× manufactured by GTR Tec Corporation) was used to measure the oxygen permeability of the sample in an environment at 30° C. and 70% RH according to the method described in JIS K7126-1 (Annex 1).

The laminate film obtained as described above was bonded with the PET film (support substrate) having a thickness of 30 μm. An acrylic pressure-sensitive adhesive was used for the bonding, and the adhesive layer was formed so that the thickness after laminating was 2 μm. The protective film (before coating layer formation) roll having an adhesive layer interposed between the laminate film (substrate side) and the support substrate was obtained thereby.

The coating layer (matte layer) having a thickness of 3 μm was formed on the surface of the support substrate of the protective film obtained as described above. The coating layer was formed by coating a coating solution containing an acrylic resin and silica microparticles (average particle size 3 μm) by a wet coating method. The protective film roll with the coating layer was obtained thereby.

[Preparation of Wavelength Conversion Sheet]

The two obtained protective films with the coating layer were prepared as the first protective film and the second protective film. CdSe/ZnS 530 (Tradename, manufactured by SIGMA-ALDRICH) as the quantum dot was mixed with an epoxy photosensitive resin, subsequently the mixed solution was coated onto the substrate side of the first protective film, and a second protective film was laminated thereon to obtain a wavelength conversion sheet by UV curing lamination.

Comparative Example 2-1

The protective film roll with the coating layer and the wavelength conversion sheet were obtained in the same manner as Example 2-1 except that the two barrier films were laminated so that the substrates face each other to prepare the laminate film, and the support substrate is bonded to the laminate film (gas barrier coating layer side).

[Evaluation of Light-Emitter Protective Film]

The films with the coating layer obtained in Example 2-1 and Comparative Example 2-1 were exposed to air at 85° C. for 1000 hours, and each of the films with the coating layer before and after the exposure was prepared.

(Amount of Change Δb* of Color Coordinate b* in L*a*b* Color System)

The color coordinate b* in the L*a*b* color system of the films with the coating layer obtained in Example 2-1 and Comparative Example 2-1 were measured before and after the high temperature exposure using a spectrophotometric color difference meter (manufactured by Nippon Denshoku Industries Co., Ltd., NF333), and the amount of change Δb* of the color coordinate b* was obtained. The measurement results of the color coordinate b* before and after the high temperature exposure and the calculation results of the amount of change Δb* are shown in Table 3.

(Spectral Transmittance)

The spectral transmittance at a wavelength of 435 nm of the films with the coating layers obtained in Example 2-1 and Comparative Example 2-1 were measured before and after the high temperature exposure using a spectrophotometer (manufactured by Shimadzu Corporation, UV3600). The measurement results of the spectral transmittance before and after the high temperature exposure and the difference therebetween are shown in Table 3.

(Water Vapor Transmission Rate)

The water vapor transmission rate of the protective films with the coating layer obtained in Example 2-1 and Comparative Example 2-1 were measured before and after the high temperature exposure by the method in conformance with the infrared sensor method of JIS K 7129. The measurement results of the water vapor transmission rate before and after the high temperature exposure are shown in Table 3. A water vapor transmission rate measurement device (product name: Permatran, manufactured by Mocon Inc.) was used for the measurement of the water vapor transmission rate. The temperature of a transmission cell was set to 40° C., the relative humidity of a high-humidity chamber was set to 90% RH, and the relative humidity of a low-humidity chamber was set to 0% RH.

TABLE 3

| | Color coordinate b* (L*a*b* color system) | | | Spectral transmittance (435 nm) | | | Water vapor transmission rate | |
|---|---|---|---|---|---|---|---|---|
| | Before high temperature exposure | After high temperature exposure | Amount of change Δb* | Before high temperature exposure | After high temperature exposure | Difference | Before high temperature exposure | After high temperature exposure |
| Example 2-1 | 1.56 | 1.62 | 0.06 | 82.07% | 82.05% | 0.02% | 4 mg/ (m² · day) | 4 mg/ (m² · day) |
| Comparative Example 2-1 | 1.76 | 4.21 | 2.45 | 82.27% | 78.07% | 4.20% | 4 mg/ (m² · day) | 20 mg/ (m² · day) |

In Example 2-1 and Comparative Example 2-1, it was confirmed that the spectral transmittance of the light-emitter protective film was high, and the water vapor transmission rate was low. In Example 2-1, the amount of change Δb* before and after the high temperature exposure was small, and the decrease of the spectral transmittance was small, whereas in Comparative Example 2-1, the amount of change Δb* was large, and the spectral transmittance greatly decreased compared to Example 1. Further, in Example 2-1, there was no change of the water vapor transmission rate before and after the high temperature exposure, whereas in Comparative Example 2-1, the water vapor transmission rate decreased. It is considered that this occurs when the adhesive layer formed with the epoxy-based adhesive is oxidized due to the high temperature exposure, and the effect of the gas barrier properties decreases due to the adhesive layer.

REFERENCE SIGNS LIST

1 . . . First barrier film; 1a . . . First substrate; 1b . . . First barrier layer; 1c . . . First gas barrier coating layer; 1v . . . First inorganic thin film layer; 2 . . . Second barrier film; 2a . . . Second substrate; 2b . . . Second barrier layer; 2c . . . Second gas barrier coating layer; 2v . . . Second inorganic thin film layer; 3 . . . Support substrate; 5 . . . First adhesive layer; 6 . . . Second adhesive layer; 7 . . . Coating layer; 10 . . . Barrier film laminate (Light-emitter protective film); 11a . . . First substrate layer; 11b . . . Second substrate layer; 12a . . . First inorganic thin film layer; 12b . . . Second inorganic thin film layer; 13a . . . First gas barrier coating layer; 13b . . . Second gas barrier coating layer; 14a . . . First barrier layer; 14b . . . Second barrier layer; 15 . . . Adhesive layer; 16a . . . First barrier film; 16b . . . Second barrier film; 20 . . . Wavelength conversion sheet; 21 . . . Phosphor layer; 22 . . . Second protective film; 50 . . . Phosphor layer; 51 . . . Sealing resin; 52 . . . Phosphor; 100 . . . Wavelength conversion sheet; 200 . . . Backlight unit; G . . . Light guide plate; L . . . Light source; R . . . Reflecting plate; 300 . . . Electroluminescent light-emitting unit.

What is claimed is:

1. A barrier film laminate, comprising:
   a first barrier film that includes a first substrate layer and a first barrier layer formed on the first substrate layer;
   a second barrier film that includes a second substrate layer and a second barrier layer formed on the second substrate layer; and
   an adhesive layer,
   wherein
   the first barrier film is bonded with the second barrier film so that the first barrier layer faces the second barrier layer through the adhesive layer,
   the first barrier layer includes a first inorganic thin film layer and a first gas barrier coating layer,
   the second barrier layer includes a second inorganic thin film layer and a second gas barrier coating layer, and
   the adhesive layer is formed of an adhesive that contains (a) an epoxy resin, (b) a curing agent that has an amino group, and (c) a silane coupling agent that has an amino group and two hydrolyzable functional groups, wherein a content of the silane coupling agent in the adhesive layer is from 7 mass % to 15 mass %.

2. The barrier film laminate of claim 1, wherein a mass content ratio between the epoxy resin and the silane coupling agent in the adhesive layer is from 1.2 to 10.0.

3. The barrier film laminate of claim 1, wherein a mass content ratio between the epoxy resin and the silane coupling agent in the adhesive layer is from 1.5 to 3.0.

4. A wavelength conversion sheet, comprising:
   the barrier film laminate of claim 1, and
   a phosphor layer formed on the first barrier film of the barrier film laminate.

5. A backlight unit comprising a light source, a light guide plate, and the wavelength conversion sheet of claim 4.

6. An electroluminescent light-emitting unit comprising the barrier film laminate of claim 1, and an electroluminescent light-emitting layer formed on the first barrier film of the barrier film laminate.

7. A barrier film laminate, comprising:
   a first barrier film that includes a first substrate layer and a first barrier layer formed on the first substrate layer;
   a second barrier film that includes a second substrate layer and a second barrier layer formed on the second substrate layer; and
   an adhesive layer,
   wherein
   the first barrier film is bonded with the second barrier film so that the first barrier layer faces the second barrier layer through the adhesive layer,
   the first barrier layer includes a first inorganic thin film layer and a first gas barrier coating layer,
   the second barrier layer includes a second inorganic thin film layer and a second gas barrier coating layer, and
   the adhesive layer is formed of an adhesive that contains (a) an epoxy resin, (b) a curing agent that has an amino group, and (c) a silane coupling agent that has an amino group and two hydrolyzable functional groups, wherein the adhesive has a content ratio between the epoxy resin and the curing agent from 0.1 to 0.35, wherein a content of the silane coupling agent that has an amino group and two hydrolyzable functional groups in the adhesive layer is from 7 mass % to 15 mass %.

8. The barrier film laminate of claim 7, wherein a mass content ratio between the epoxy resin and the silane coupling agent in the adhesive layer is from 1.2 to 10.0.

9. The barrier film laminate of claim 7, wherein a mass content ratio between the epoxy resin and the silane coupling agent in the adhesive layer is from 1.5 to 3.0.

10. A wavelength conversion sheet, comprising:
    the barrier film laminate of claim 7, and
    a phosphor layer formed on the first barrier film of the barrier film laminate.

11. A backlight unit comprising a light source, a light guide plate, and the wavelength conversion sheet of claim 10.

12. An electroluminescent light-emitting unit comprising the barrier film laminate of claim 7, and an electroluminescent light-emitting layer formed on the first barrier film of the barrier film laminate.

* * * * *